US009098845B2

(12) United States Patent
Florek et al.

(10) Patent No.: US 9,098,845 B2
(45) Date of Patent: Aug. 4, 2015

(54) PROCESS OF SELLING IN ELECTRONIC SHOP ACCESSIBLE FROM THE MOBILE COMMUNICATION DEVICE

(75) Inventors: Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 91 days.

(21) Appl. No.: 12/957,130

(22) Filed: Nov. 30, 2010

(65) Prior Publication Data

US 2011/0196796 A1 Aug. 11, 2011

Related U.S. Application Data

(63) Continuation-in-part of application No. PCT/IB2010/054229, filed on Sep. 17, 2010, and a continuation-in-part of application No. 12/747,114, filed as application No. PCT/IB2009/054097 on Sep.

(Continued)

(51) Int. Cl.
*G06Q 20/32* (2012.01)
*G06Q 20/12* (2012.01)
*G06Q 20/38* (2012.01)

(52) U.S. Cl.
CPC ............. *G06Q 20/32* (2013.01); *G06Q 20/12* (2013.01); *G06Q 20/325* (2013.01); *G06Q 20/3226* (2013.01); *G06Q 20/3278* (2013.01); *G06Q 20/382* (2013.01); *G06Q 20/3825* (2013.01)

(58) Field of Classification Search
CPC ..................................................... G06Q 20/32
See application file for complete search history.

(56) References Cited

U.S. PATENT DOCUMENTS 5,288,979 A 2/1994 Kreft
5,303,198 A 4/1994 Adachi et al.
(Continued)

FOREIGN PATENT DOCUMENTS

CN 1450782 10/2003
CN 1627321 6/2005
(Continued)

OTHER PUBLICATIONS

Khu-Smith et al., Using EMV Cards to Protect E-commerce Transactions, Springer, EC-Web 2002, LNCS 2455, pp. 388-399.*
(Continued)

*Primary Examiner* — Jacob C. Coppola
(74) *Attorney, Agent, or Firm* — Baker & Hostetler LLP

(57) ABSTRACT

The process encompasses the communication between trade system accessible over GUI of the mobile communication device (4), when after the item being purchased is selected, the acquirer's (12) identification is loaded from the removable memory card (1). The acquirer's (12) identification is sent to the trade system's (2) headquarters, where after it is approved, the transaction payment parameters are created and these enter the removable memory card (1) as an initiator of the payment terminal application. The payment terminal application runs on the removable memory card (1) and it creates a payment cryptogram. This one is sent into the trade system's (2) headquarters, where it can be handled as a common cryptogram of usual POS terminals. The process can encompass even a preparation and pre-preparation phase, thanks to which corresponding applications of individual participants of the system are installed, configured and activated. The online payment can preferably realize even the reset of the counter on the payment device.

20 Claims, 21 Drawing Sheets

Related U.S. Application Data 18, 2009, application No. 12/957,130, which is a continuation-in-part of application No. 12/746,867, filed as application No. PCT/IB2009/054101 on Sep. 18, 2009, now Pat. No. 8,799,084, application No. 12/957,130, which is a continuation-in-part of application No. 12/866,774, filed as application No. PCT/IB2010/051779 on Apr. 23, 2010, now Pat. No. 8,500,008, application No. 12/957,130, which is a continuation-in-part of application No. 12/898,976, filed on Oct. 6, 2010, now Pat. No. 8,583,493, which is a continuation of application No. PCT/IB2010/051915, filed on May 1, 2010, application No. 12/957,130, which is a continuation-in-part of application No. 12/899,346, filed on Oct. 6, 2010, now Pat. No. 8,406,809, which is a continuation of application No. PCT/IB2010/051915, filed on May 1, 2010, application No. 12/957,130, which is a continuation-in-part of application No. 12/899,378, filed on Oct. 6, 2010, now Pat. No. 8,606,711, which is a continuation of application No. PCT/IB2010/051915, filed on May 1, 2010.

(56) References Cited

U.S. PATENT DOCUMENTS

| | | | |
|---|---|---|---|
| 5,574,470 A | 11/1996 | de Vall | |
| 5,578,808 A | 11/1996 | Taylor | |
| 5,608,417 A | 3/1997 | de Vall | |
| 5,671,279 A * | 9/1997 | Elgamal | 705/79 |
| 6,062,472 A | 5/2000 | Cheung | |
| 6,070,795 A | 6/2000 | Feiken | |
| 6,070,796 A | 6/2000 | Sirbu | |
| 6,154,181 A | 11/2000 | Hu-Guo et al. | |
| 6,323,064 B1 | 11/2001 | Lee et al. | |
| 6,450,407 B1 | 9/2002 | Freeman et al. | |
| 6,615,243 B1 | 9/2003 | Meggeid et al. | |
| 6,745,935 B1 | 6/2004 | Grieu et al. | |
| 6,828,670 B2 | 12/2004 | Hayana et al. | |
| 6,976,011 B1 | 12/2005 | Capitant et al. | |
| 7,051,429 B2 | 5/2006 | Kerr et al. | |
| 7,083,085 B1 | 8/2006 | Daniels et al. | |
| 7,103,575 B1 * | 9/2006 | Linehan | 705/64 |
| 7,357,309 B2 * | 4/2008 | Ghosh et al. | 235/380 |
| 7,364,092 B2 | 4/2008 | Narendra et al. | |
| 7,374,100 B2 | 5/2008 | Jei et al. | |
| 7,436,965 B2 | 10/2008 | Sherman | |
| 7,458,518 B2 | 12/2008 | Fukuda et al. | |
| 7,481,358 B2 | 1/2009 | Honjo et al. | |
| 7,568,065 B2 | 7/2009 | D'Athis | |
| 7,581,678 B2 * | 9/2009 | Narendra et al. | 235/451 |
| 7,689,932 B2 | 3/2010 | Maktedar | |
| 7,775,442 B2 | 8/2010 | Saarisalo | |
| 7,805,615 B2 | 9/2010 | Narendra et al. | |
| 7,828,214 B2 | 11/2010 | Narendra et al. | |
| 8,055,184 B1 | 11/2011 | DiMartino et al. | |
| 8,127,999 B2 | 3/2012 | Diamond | |
| 8,355,670 B2 | 1/2013 | White | |
| 2001/0005832 A1 | 6/2001 | Cofta et al. | |
| 2001/0033013 A1 | 10/2001 | Lee | |
| 2002/0038287 A1 * | 3/2002 | Villaret et al. | 705/41 |
| 2002/0062249 A1 * | 5/2002 | Iannacci | 705/14 |
| 2002/0147658 A1 | 10/2002 | Kwan | |
| 2002/0163479 A1 | 11/2002 | Lin | |
| 2003/0055738 A1 * | 3/2003 | Alie | 705/26 |
| 2003/0105930 A1 | 6/2003 | Okamoto | |
| 2003/0138135 A1 | 7/2003 | Chung et al. | |
| 2004/0019564 A1 * | 1/2004 | Goldthwaite et al. | 705/44 |
| 2004/0066278 A1 | 4/2004 | Hughes et al. | |
| 2004/0087339 A1 | 5/2004 | Goldthwaite et al. | |
| 2004/0127256 A1 | 7/2004 | Goldthwaite et al. | |
| 2005/0011960 A1 | 1/2005 | Koike et al. | |
| 2005/0072595 A1 | 4/2005 | Cho | |
| 2005/0092835 A1 | 5/2005 | Chung et al. | |
| 2005/0116050 A1 | 6/2005 | Jei et al. | |
| 2005/0125745 A1 | 6/2005 | Engestrom | |
| 2005/0222949 A1 * | 10/2005 | Inotay et al. | 705/40 |
| 2005/0269401 A1 | 12/2005 | Spitzer et al. | |
| 2005/0269402 A1 | 12/2005 | Spitzer et al. | |
| 2006/0143578 A1 | 6/2006 | Maktedar | |
| 2006/0146023 A1 | 7/2006 | Kidron | |
| 2006/0152288 A1 | 7/2006 | Peng et al. | |
| 2006/0186209 A1 | 8/2006 | Narendra et al. | |
| 2006/0219776 A1 | 10/2006 | Finn | |
| 2006/0224470 A1 * | 10/2006 | Garcia Ruano et al. | 705/27 |
| 2006/0226217 A1 | 10/2006 | Narendra et al. | |
| 2006/0255160 A1 | 11/2006 | Winkler | |
| 2007/0014407 A1 | 1/2007 | Narendra et al. | |
| 2007/0014408 A1 | 1/2007 | Narendra et al. | |
| 2007/0016957 A1 | 1/2007 | Seaward et al. | |
| 2007/0050871 A1 | 3/2007 | Mashhour | |
| 2007/0083772 A1 | 4/2007 | Harada et al. | |
| 2007/0106564 A1 | 5/2007 | Matotek et al. | |
| 2007/0106619 A1 * | 5/2007 | Holdsworth | 705/67 |
| 2007/0125840 A1 | 6/2007 | Law et al. | |
| 2007/0152035 A1 | 7/2007 | Adams et al. | |
| 2007/0158438 A1 | 7/2007 | Fukuda et al. | |
| 2007/0171079 A1 | 7/2007 | Saito | |
| 2007/0233615 A1 | 10/2007 | Tumminaro | |
| 2007/0235539 A1 | 10/2007 | Sevanto et al. | |
| 2007/0241180 A1 | 10/2007 | Park et al. | |
| 2007/0278290 A1 | 12/2007 | Messerges et al. | |
| 2007/0293155 A1 | 12/2007 | Liao et al. | |
| 2008/0011833 A1 | 1/2008 | Saarisalo | |
| 2008/0048036 A1 | 2/2008 | Matsumoto et al. | |
| 2008/0059375 A1 | 3/2008 | Abifaker | |
| 2008/0093467 A1 | 4/2008 | Narendra et al. | |
| 2008/0103972 A1 * | 5/2008 | Lanc | 705/44 |
| 2008/0111972 A1 | 5/2008 | Ochi et al. | |
| 2008/0120129 A1 | 5/2008 | Seubert et al. | |
| 2008/0129629 A1 | 6/2008 | Kimura et al. | |
| 2008/0207124 A1 | 8/2008 | Raisanen et al. | |
| 2008/0233906 A1 | 9/2008 | Mitomo et al. | |
| 2008/0245851 A1 | 10/2008 | Kowalski | |
| 2008/0250244 A1 | 10/2008 | Baentsch et al. | |
| 2008/0270246 A1 | 10/2008 | Chen | |
| 2008/0306828 A1 | 12/2008 | Chao | |
| 2009/0063312 A1 * | 3/2009 | Hurst | 705/30 |
| 2009/0065571 A1 | 3/2009 | Jain | |
| 2009/0065572 A1 | 3/2009 | Jain | |
| 2009/0069049 A1 | 3/2009 | Jain | |
| 2009/0069050 A1 | 3/2009 | Jain et al. | |
| 2009/0069051 A1 | 3/2009 | Jain et al. | |
| 2009/0069052 A1 | 3/2009 | Jain et al. | |
| 2009/0070272 A1 | 3/2009 | Jain | |
| 2009/0070691 A1 | 3/2009 | Jain | |
| 2009/0070861 A1 | 3/2009 | Jain | |
| 2009/0088077 A1 | 4/2009 | Brown et al. | |
| 2009/0098825 A1 | 4/2009 | Huomo et al. | |
| 2009/0108063 A1 | 4/2009 | Jain et al. | |
| 2009/0119190 A1 | 5/2009 | Realini | |
| 2009/0124273 A1 | 5/2009 | Back | |
| 2009/0132418 A1 * | 5/2009 | Morsillo et al. | 705/44 |
| 2009/0143104 A1 | 6/2009 | Loh et al. | |
| 2009/0144456 A1 | 6/2009 | Gelf et al. | |
| 2009/0157936 A1 | 6/2009 | Goss et al. | |
| 2009/0191812 A1 | 7/2009 | Teruyama et al. | |
| 2009/0193491 A1 | 7/2009 | Rao | |
| 2009/0199206 A1 | 8/2009 | Finkenzeller et al. | |
| 2009/0199283 A1 | 8/2009 | Jain | |
| 2009/0200371 A1 | 8/2009 | Kean et al. | |
| 2009/0261172 A1 | 10/2009 | Kumar et al. | |
| 2009/0265544 A1 | 10/2009 | Moona et al. | |
| 2009/0265552 A1 | 10/2009 | Moshir et al. | |
| 2009/0298540 A1 | 12/2009 | Narendra et al. | |
| 2009/0307139 A1 | 12/2009 | Mardikar et al. | |
| 2009/0307142 A1 | 12/2009 | Mardikar | |
| 2009/0319287 A1 | 12/2009 | Hammad et al. | |
| 2010/0012721 A1 | 1/2010 | Jain et al. | |
| 2010/0023449 A1 | 1/2010 | Skowronek et al. | |
| 2010/0044444 A1 | 2/2010 | Jain et al. | |
| 2010/0045425 A1 | 2/2010 | Chivallier | |
| 2010/0062808 A1 | 3/2010 | Cha et al. | |

(56) References Cited

U.S. PATENT DOCUMENTS

| | | | |
|---|---|---|---|
| 2010/0063893 A1 | 3/2010 | Townsend | |
| 2010/0082490 A1 | 4/2010 | Rosenblatt et al. | |
| 2010/0181377 A1 | 7/2010 | Chen et al. | |
| 2010/0197224 A1 | 8/2010 | Lahdenniemi et al. | |
| 2010/0203870 A1 | 8/2010 | Hubinak et al. | |
| 2010/0205432 A1 | 8/2010 | Corda et al. | |
| 2010/0213265 A1 | 8/2010 | Narendra et al. | |
| 2010/0258639 A1 | 10/2010 | Florek et al. | |
| 2010/0262503 A1 | 10/2010 | Florek et al. | |
| 2010/0274677 A1 | 10/2010 | Florek et al. | |
| 2010/0274726 A1 | 10/2010 | Florek et al. | |
| 2010/0323617 A1 | 12/2010 | Hubinak et al. | |
| 2011/0196796 A1* | 8/2011 | Florek et al. .................... | 705/64 |
| 2011/0264543 A1 | 10/2011 | Taveau et al. | |
| 2011/0282753 A1 | 11/2011 | Mullen et al. | |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/041245 | 4/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

Balfe et al., Augmenting Internet-based Card Not Present Transactions with Trusted Computing: An Analysis, 2006, all pages.*
Balfe et al., e-EMV: Emulating EMV for Internet Payments with Trusted Computing Technologies, Oct. 31, 2008, all pages.*
Madlmayr et al., "Management of Multiple Cards in NFC-Deivces", LNCS, 2008, 21 pages.
Wikipedia, "Bluetooth", Wikipedia, The Free Encyclopedia, http://enwikipedia.org/wiki/bluetooth, accessed Apr. 8, 2012, 19 pages.
Wikipedia, "Cellular Frequencies" Wikipedia, The Free Encyclopedia, http://en.wikipedia.org/wiki/cellular_frequencies, accessed Apr. 8, 2012, 5 pages.
"EMV Mobile Contactless Payment: Technical Issues and Position Paper", www.emvco.com/mobile.aspx, © Oct. 11, 2007, accessed Apr. 20, 2009, 37 pages.
"NFC Frequently Asked Questions," NFC for Customers, www.nfc-forum.org., Retrieved from the internet on Nov. 7, 2008, 5 pages.
Smart Card Alliance, "RF-Enabled Applications and Technology: Comparing and Contrasting RFID and RF-Enabled Smart Cards", Smart Card Alliance Identity Council, Jan. 2007, 7 pages.
Smart Card Alliance: "Proximity Mobile Payments: Leveraging NFC and the Contactless Financial Payments Infrastructure a Smart Card Alliance Contactless Payments Council White Paper", www.smartcardalliance.org, © Sep. 1, 2007, accessed Nov. 7, 2008, 10 pages.
"Intelligent Mouse", IBM Technical Disclosure Bulletin, International Business Machines Corp., Thornwood, US, Feb. 1, 1995, 38(2), p. 463.
Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

* cited by examiner

PROCESS OF SELLING IN ELECTRONIC SHOP ACCESSIBLE FROM THE MOBILE COMMUNICATION DEVICE

CROSS-REFERENCE TO RELATED APPLICATIONS

This application is a continuation-in-part of PCT application no. PCT/IB2010/054229, filed Sep. 17, 2010, which claims priority from Slovak patent application no. PP50021-2010, filed May 12, 2010, a continuation-in-part of U.S. patent application Ser. No. 12/747,114, filed Jun. 9, 2010, which is a U.S. National Stage filing of PCT application no. PCT/IB2009/054097, filed Sep. 18, 2009, which claims priority from Slovak patent application no. PP5085-2008, filed Sep. 19, 2008, a continuation-in-part of U.S. patent application Ser. No. 12/746,867, filed Jun. 8, 2010, which is a U.S. National Stage filing of PCT application no. PCT/IB2009/054101, filed Sep. 18, 2009, which claims priority from Slovak patent application no. PP5086-2008, filed Sep. 19, 2008, a continuation-in-part of U.S. patent application Ser. No. 12/866,774, filed Aug. 9, 2010, which is a U.S. National Stage filing of PCT application no. PCT/IB2010/051779, filed Apr. 23, 2010, which claims priority from Slovak patent application no. PP50024-2009, filed Apr. 24, 2009, a continuation-in-part of U.S. patent application Ser. No. 12/898,976, filed Oct. 6, 2010, which is a continuation of PCT application no. PCT/IB2010/051915, filed May 1, 2010, which claims priority from Slovak patent applications PP00032-2009, filed May 3, 2009, PP50009-2010, filed Mar. 27, 2010, PP50016-2010, filed Apr. 19, 2010, and PP50012-2010, filed Apr. 8, 2010, a continuation-in-part of U.S. patent application Ser. No. 12/899,346, filed Oct. 6, 2010, which is a continuation of PCT application no. PCT/IB2010/051915, filed May 1, 2010, which claims priority from Slovak patent applications PP00032-2009, filed May 3, 2009, PP50009-2010, filed Mar. 27, 2010, PP50016-2010, filed Apr. 19, 2010, and PP50012-2010, filed Apr. 8, 2010, and a continuation-in-part of U.S. patent application Ser. No. 12/899,378, filed Oct. 6, 2010, which is a continuation of PCT application no. PCT/IB2010/051915, filed May 1, 2010, which claims priority from Slovak patent applications PP00032-2009, filed May 3, 2009, PP50009-2010, filed Mar. 27, 2010, PP50016-2010, filed Apr. 19, 2010, and PP50012-2010, filed Apr. 8, 2010. Each of the above-referenced patent applications is hereby incorporated herein by reference.

TECHNOLOGY

The solution refers to cooperation between the virtual shop systems, payment system and clearing system that can be assured by different entities. The solution also describes the way of installation, activation of the selected hardware elements, the way of user registration in the system and the process of realization of payment-terminal operations by which it is possible to ensure a reliable and secure process of payment and sales.

PRESENT TECHNOLOGY

The users of the mobile communication devices that can be in different forms such as the mobile phones, PDA tablets, notebooks have available an electronic trade system (e.g. in the form of OVI store by Nokia), in which they can buy various electronic items such as ring tone downloads, songs, maps, games and other applications. The user must register before the first purchase and log into the trade system and usually he also has to install a corresponding application, which communicates with the corresponding trade system in the headquarters, into his mobile communication device. The user can be asked to enter user name and password, under which he will be always recognized. After the creation of his own account in the trade system, the user is informed of the result of the registration and he can also be then logged into the trade system. For the verification of registration, an e-mail or SMS message with an activation link can be sent from the trade system to a selected e-mail address or phone number. By clicking on the activation link the entered e-mail or phone number is verified in the trade system. The user's registration can also be linked to the confirmation of acceptance of the trade conditions of the trade system's provider.

After successful creation of the user's account, the user can select the goods he wants to buy, e.g. MP3. By clicking on the "buy" item, the trade system requests that the password be entered. After successful verification of the user, there is the selection of the payment card by which the user wants to pay. According to the selection of the payment card, the user is asked to enter PAN, the card's number, date, card expiration and also the CVC2/CVV2 code. The information inserted in such a way IS sent TO the trade systems headquarters, where it is processed as a common payment by a payment card. In order to increase comfort, this data of the payment card or several payment cards can be stored even in the mobile communication device. The disadvantage of this configuration is that in case of remote verification of the payment card there comes to the transfer of sensitive data into the trade system headquarters. Even though the amount paid for the items in the trade system accessible from the mobile communication device is relatively low, in general in small units of euro or dollars, there exists a risk of payment card's data misuse during any unauthorized withdrawal by a third person. So the system should offer a higher level of security, however it should not increase transaction costs or decrease the comfort because in case of small payments and purchases, the user is not willing to deal with complicated procedures.

SUBJECT MATTER OF THE INVENTION

The disadvantages mentioned are to a great extent eliminated by a process during selling in the electronic shop accessible from the mobile communication device according to this technical solution, which encompasses above all these FOLLOWING steps:

A1. insertion of the removable memory card into the corresponding slot of the mobile communication device, where the insertion starts self-installation of the corresponding application software.

A2. setting up of the application's configuration data, where this step can encompass even the selection and insertion of the user password. During configuration there can also come to the pairing of the removable memory card with the specific mobile communication device and that e.g. to the SIM card or to the mobile communication device's hardware. At this point, the user's registration can encompass also the communication with the remote headquarters of the trade system, where the identification data of the user will be stored.

A3. activation of the removable memory card through the activation key, which will be assigned by the card's issuer and/or the user's bank After entering the correct activation key, the removable memory card and also the payment application associated with it become ready for use.

In case there is no program for the communication with the trade system installed in the mobile communication device, then the installation of such a program can start now along with the registration of the user with the trade system. During this installation, the payment terminal on the removable memory card can be set as the preferred way of payment. In case the payment application is installed at a time when the application for the communication with the trade system is already installed and the user is already registered, the possibility of supplementary setting of the preferred way of payment is used.

The steps described so far represent a preparation phase, for which it is enough to be realized only once during the given hardware connection between the removable memory card and the specific mobile communication device. The next phase represents the execution of a trade, which includes in it the run of the payment terminal application according this solution with the following steps:

B1. After deciding to purchase an item from the trade system, the user goes to the menu of the mobile communication device and runs the corresponding user application for the trade system. In this step the stored parameters of the user's account are loaded and the user is enabled to select the desired item by looking through the items in the remote headquarters of the trade system.

B2. The user agrees to purchase the selected item. The trade system asks him to enter the password that belongs to the given account of the user. (Alternatively, the password can be provided automatically from a secure location on the memory card.)

B3. On the display of the mobile communication device there appears the possibility of payment where the preferred way can be the preset payment possibility described in this description above. The application waits for the confirmation from the user. After the confirmation, the payment-terminal application runs directly on the removable memory card. After the selection of the payment application according to this solution, the controller and the interface between the removable memory card and the mobile communication device is activated. In case the check of the entered password (if optionally required) of the payment terminal application is positive then the acquirer's configuration data are loaded into the payment-terminal application. By this the general generic payment terminal becomes a specific terminal with the acquirer's identity. The payment terminal unit could have the acquirer's identification data pre-inserted and loaded as the basic data and only data of the payment terminal, however by this the otherwise wide possibilities of the usability of the payment terminal on the removable memory card would be narrowed. Subsequently, the acquirer's identification data are sent into the headquarters of the trade system over communication tools that are offered by the mobile communication device itself, this means e.g. over GPRS (General Packet Radio Service) channel. In the headquarters of the trade system it is checked whether these identification data of the acquirer belong to a contract partner of the trade system operator. Positive evaluation causes that a file with payment parameters, including the amount being paid, is sent from the trade system to the mobile communication device. The evaluation of the acquirer's status basically means to find out the pertinence to the given trade system.

The data set with payment parameters may or may not be encrypted. After its reception into the mobile communication device, the file with input parameters is sent over the corresponding interface and controller to the payment terminal unit on the removable memory card. The payment terminal unit starts the communication with the payment card unit. The communication between them is the same as if it was a connection between the POS (point of sale) terminal and ICC (integrated circuit card) payment card inserted in a payment card reader. The result of the transaction is encrypted by the acquirer's private key and is sent over the removable memory card's interface to the mobile communication device, which sends the payment cryptogram to the trade system's headquarters.

In the trade system's headquarters the payment cryptogram is decrypted by the acquirer's public key and its status is evaluated. The payment can be processed as offline or online payment. In case of offline payment the trade system's headquarters does not have to be always connected to the acquirer. In case of declining response in a common ACC (Application Authentication Cryptogram) the user is sent the information of the fact that the payment was declined. In case the offline payment is evaluated positively, the user is sent a confirmative response in the TC (Transaction Certificate) form.

The online payment is evaluated through the connection with the acquirer. In case of requesting the response in the ARQC form (Authorization Request Cryptogram), the trade system is connected to the acquirer's system with the question and task for authorization of the payment. The authorization is realized in connection with the payment card's issuer's system. The response to the ARQC request file is a cryptogram in the ARPC (Authorization Response Cryptogram) form, which contains a confirmation or declination of the payment. The message is encrypted by the acquirer's private key.

The acquirer sends the cryptogram to the trade system's headquarters, where the final decision act is realized according to the type of the cryptogram and the user is informed on its result in the form of AAC/TC (or a corresponding message) on the display of the mobile communication device. In this way the payment terminal application runs as an online application, which enables the terminal to realize a preset number of the offline payments according to the settings on the payment card. In order to ensure the reset of the counter it is appropriate if the ARPC payment cryptogram is sent over the interface to the removable memory card after it is received by the mobile communication device. There the payment terminal unit receives this cryptogram and sends an instruction for the reset of the counter into the payment card unit.

The acquirer creates payment files, which from the cooperating banks' point of view have the same structure as if they were created during a payment on a common POS terminal. Given that, the settlement of the transaction and subtraction of the amount form the user's account is the same as in case of normal current cashless transactions.

B4. After successful completion and confirmation of the payment application, the confirmation of payment is displayed to the user and subsequently data which represent the item purchased are transferred from the trade system. In principle, the transfer is possible into the user's mobile communication device or even to a third person's device to whom the user sends the purchased item as e.g. a gift. After this phase is over, the application in the mobile communication device offers the possibility to return directly to the point B1 for the realization of the purchase of further item or it returns to the common menu on the display.

In order to assure the run of individual above mention steps the following units can be located on the removable memory card: payment terminal application unit, especially of the EMV standard (Europay, MasterCard, VISA), the payment card unit, microcontroller, cryptographic unit, the unit of self installation. A NFC communication element with an antenna can also be part of the removable memory card, thanks to which the removable memory card becomes capable of communication with standard POS terminals, and it will be possible to use it not only for payments in a remote trade system where the communication is assured by the mobile communications device, e.g. over GPRS The removable memory card is inserted in the corresponding slot of the mobile communication device representing an element that is held by the user. This removable memory card has corresponding software was provided by the acquirer, which has a contractual relationship with the operator of the trade system. The acquirer's system is connected with the trade system on a remote location outside the mobile communication device and the acquirer's system encompasses the unit with the payment terminal's configuration data and also the encryption and decryption unit. In case of agreement between the operator of the trade system and the acquirer the package with a program for communication with the trade system can be a part of the removable memory card.

The issuer of the card, e.g. the bank that provides the corresponding data into the payment card unit located on the removable memory card, is part of assurance of the run of the cashless payments. The acquirer and the card's issuer may be, but do not have to be the same entity.

The suitable arrangement of relations between the user and individual operators of trade systems will include a contract between the user and the card's issuer, a contract between the acquirer and the operator of the trade system and a contract between the acquirer and the card's issuer. The operator of the trade system does not have to have his bank account at the payment card issuer but he can have his money sent to an account in another bank. The solution described allows some participants to merge, e.g. the payment card's issuer can be even an acquirer, but the advantage of the solution presented is in the fact that it enables to use the existing systems and relations between the card issuer, banks and operators of trade systems. In the communication protocols between existing participants of such systems, the existing standards are used and the increased comfort and safety is assured thanks to the acquirer's system which is distributed on the removable memory cards to the users in accordance with this solution. This system ensures a high level of security when even for small payments (several Euro or dollars), which run through standard payment terminal application and the sensitive data are not provided to a remote location, such as a central trade system, Internet browsers and similar.

After implementation of the systems and process here described into practice it can be supposed that the mobile communication device can become attack target with the goal of stealing the data of payment card, which is constantly prepared for the cooperation with the mobile communication device's circuits. In ideal configuration it will be possible to lower this risk in case the removable card had two independent access modes. One access mode is designed and set for the common function of the removable memory card which rests in the extension of the memory capacity of the mobile communication device, such as a mobile phone. This access mode prevents access to the unit with the payment card and to the contactless communication element on the removable memory card. Basically in this access mode on the removable memory card's interface this card appears to be a common removable card without the secure element and without the communication element on the removable memory card.

The second access mode is designed and set for the payment function of the removable memory card, where the access to the unit with the payment card and also to the contactless communication element on the removable memory card is allowed from the mobile communication device's circuits over an interface. In case there is even the unit with the payment terminal located on the removable memory card, then this unit is also accessible just and only in the access mode for the payment function.

The two modes are alternatively selectable, it is important, that the access mode for the payment function of the removable memory card can be active only after physical press of the hardware payment button.

The removable memory card, on which at least one payment card unit is located, appears to be a removable memory card for the extension of the memory capacity of the mobile communication device on the interface and that up until the moment when the purpose payment button is physically pushed. Then the removable memory card is made accessible on the interface as a card with Secure Element and at least one payment card unit.

During common usage of the mobile communication device, the removable memory card behaves as if it contained only a flash memory for the extension of the memory capacity with a corresponding microcontroller. In this state the reading and writing of files is enabled in the memory of the removable memory card, however other elements, e.g. the Secure Element, the NFC communication element are hidden and cannot be managed or run in this mode.

The existence of the purpose hardware payment button enables the change of the removable payment card's character on its interface level to be tied exclusively to the physical press of the payment button. The necessity of physical press of the button excludes the possibility to run the payment application by some undesirable software or script imitating the will of the user.

By this configuration we will exclude the risk that the removable memory card's interface will be misused for the trials to overcome the security elements without the user's knowledge. The connection between the physical press of the button and run of the corresponding Firmware can be stored in the memory in such a way that it is either never possible to rewrite it, change it or update it or it is not possible to do it without the corresponding password. The unauthorized program then cannot emulate the signal from the physical payment button in such a way so this signal could appear as a real physical press of the button to the other steps of the application's run. Since the intruder will not have the possibility to physically press the button described on the remote mobile communication device, it is excluded that he could gain uncontrollable access to the payment card's unit or to the unit of the payment terminal on the removable memory card. The removable memory card will behave as a standard memory card and only after physical press of the payment button will switch into the payment card mode. The end of payment application will automatically switch the card's mode into the common card extending the memory capacity mode.

FIGURES OVERVIEW

The solution is described in more detail on the FIGS. 1 to 45.

On the FIGS. 1 to 3 there are diagrams which gradually show the four steps of the preparatory phase with the installation of the payment application, which occurs after the insertion of removable memory card into the mobile phone's slot. On FIG. 2 there is also an example of how the personal data are entered during the configuration of the payment application. On FIG. 3 there is the step with entering a password from the supplier of the removable memory card.

On FIG. 4 there is an example of the mobile phone's display in case there is the possibility of pairing the mobile communication device with the removable memory card.

FIG. 5 demonstrates the way how the activation key, which belongs to the specific removable memory card, is entered.

On FIG. 6 a successful completion of the installation of removable memory card is shown.

FIG. 7 contains the step with the proposition to install the application, which is designed for communication with the trade system.

Figure 11:
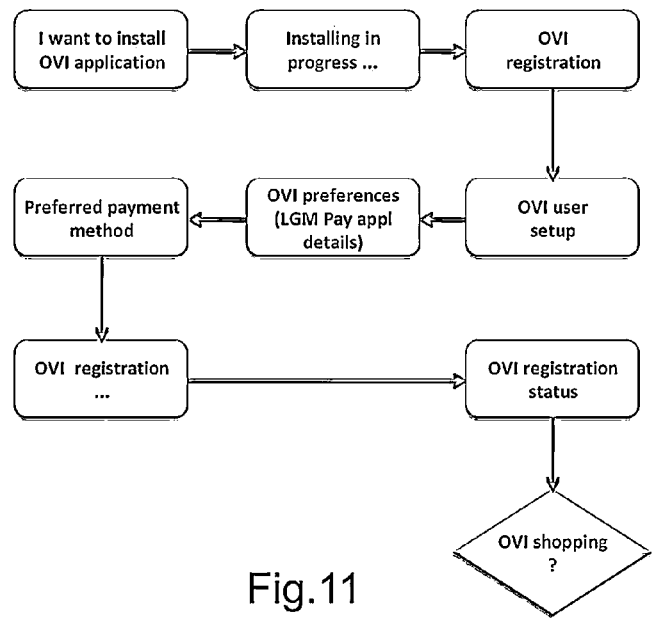
Figure 11:

On FIG. 11 there is an example of successful completion of the registration in the trade system, which is connected with an offer to start shopping.

Figure 12:
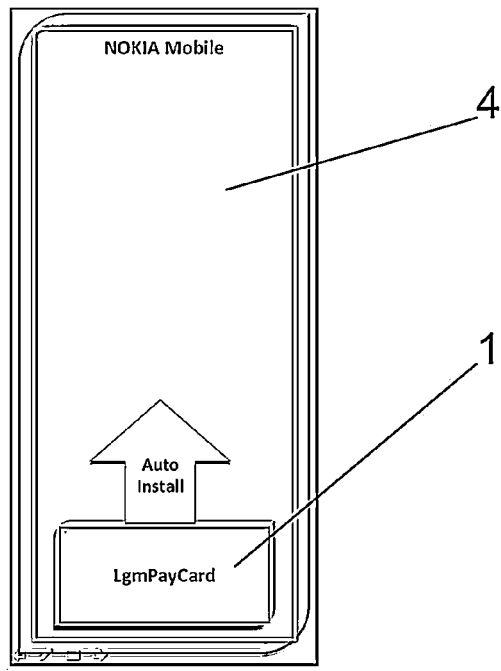

On FIG. 12 there is a block scheme showing the first insertion of the removable memory card into the mobile communication device, after which self installation begins.

Figure 13:
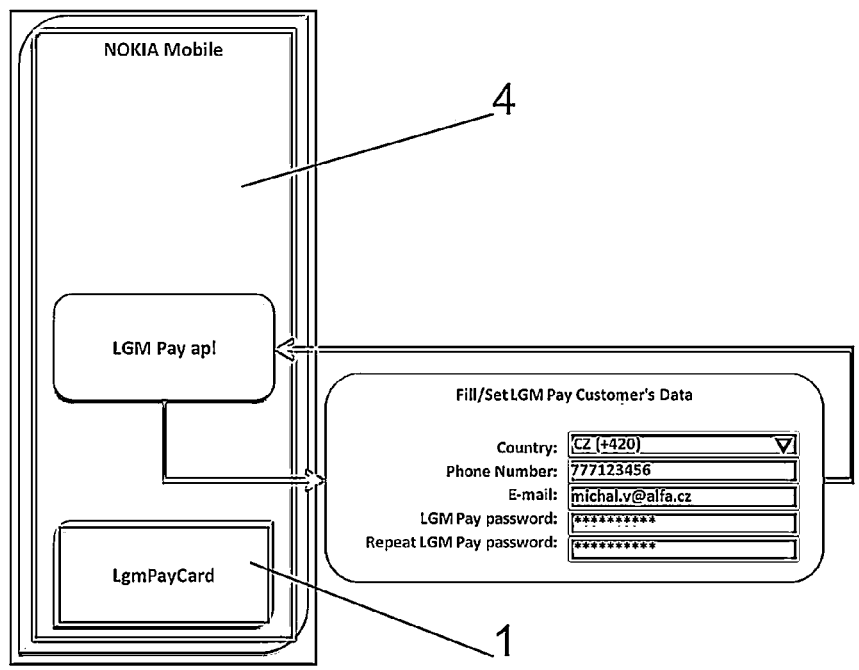

On FIG. 13 there is an example of the structure of the data entered into the payment application by the user.

Figure 14:
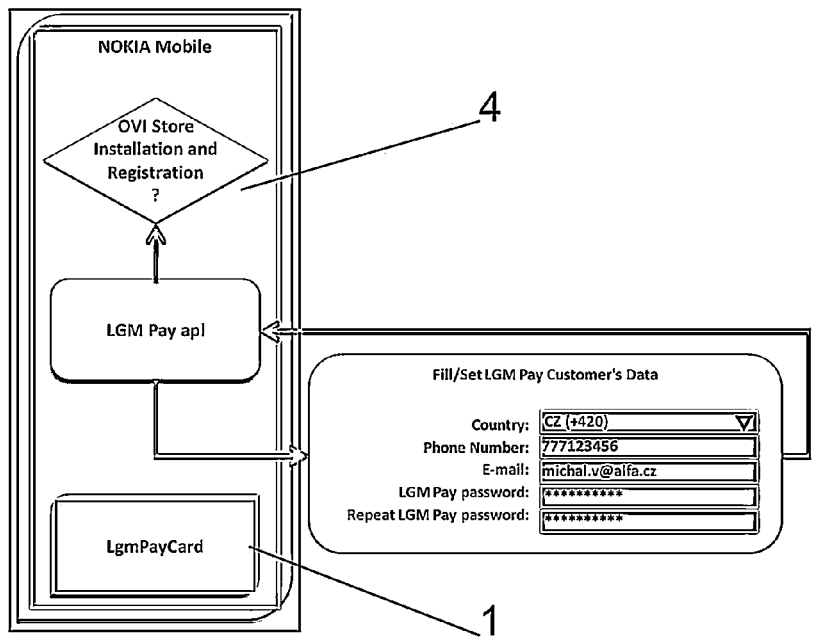

On FIG. 14 there is the possibility that the data entered by the user before are used even during the installation and registration of the application for the communication with the trade system.

Figure 15:
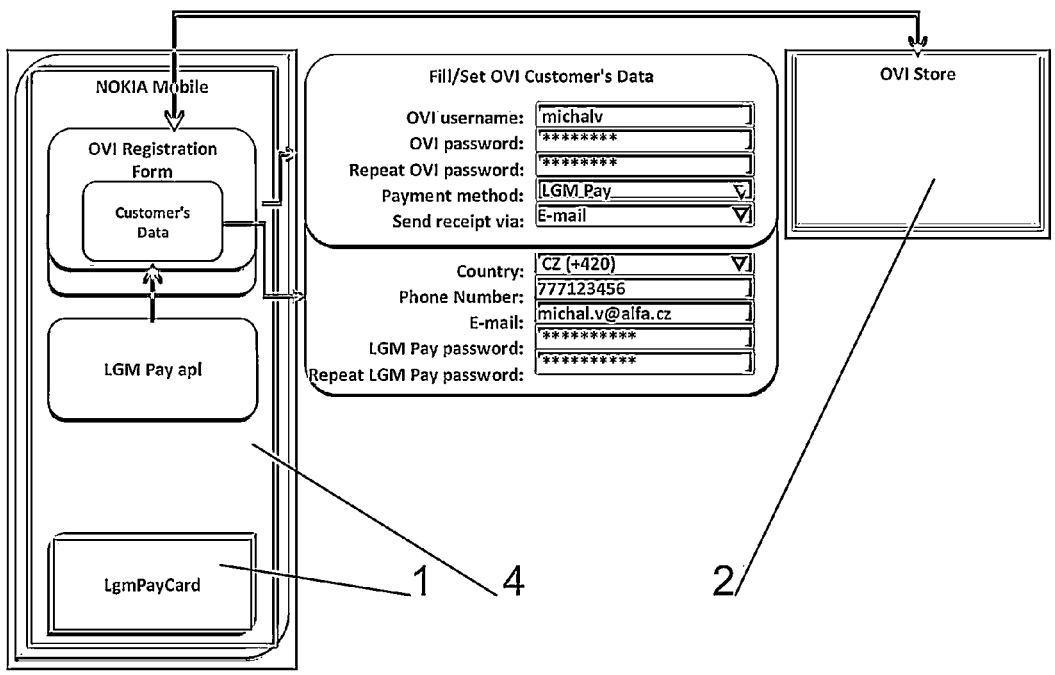
Figure 16:
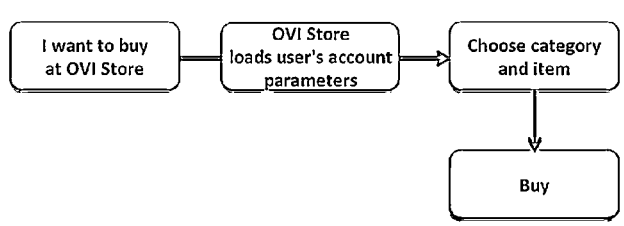
Figure 16:
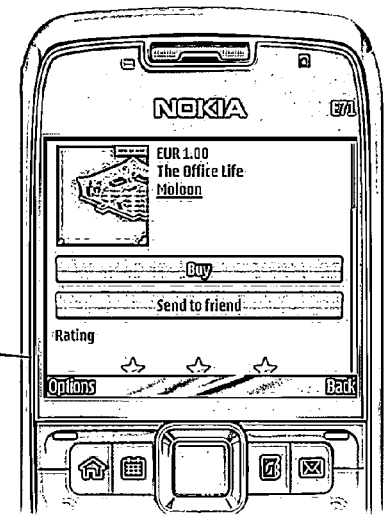
Figure 17:
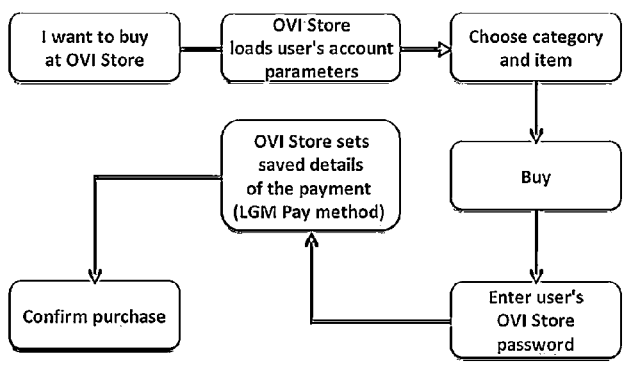
Figure 17:
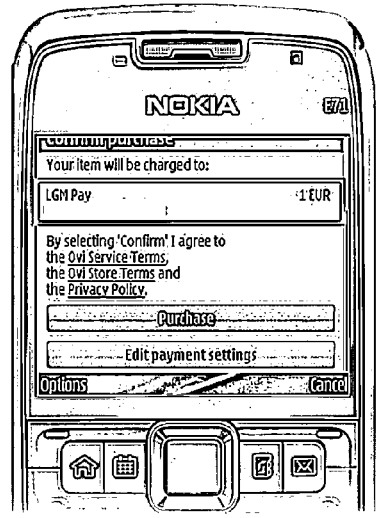
Figure 18:
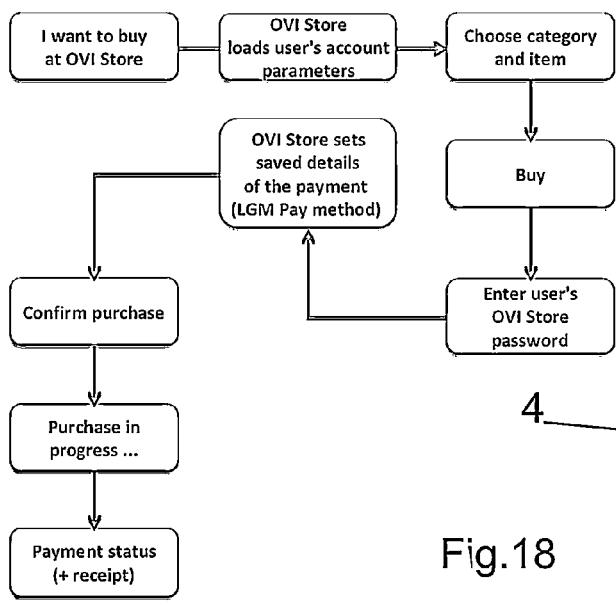
Figure 18:
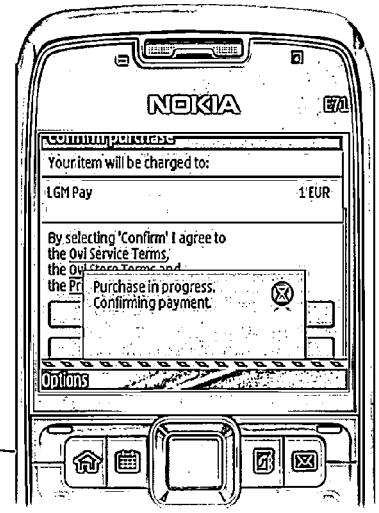

On FIG. 15 there is a transmission of user data into the trade system's headquarters.

Figure 19:
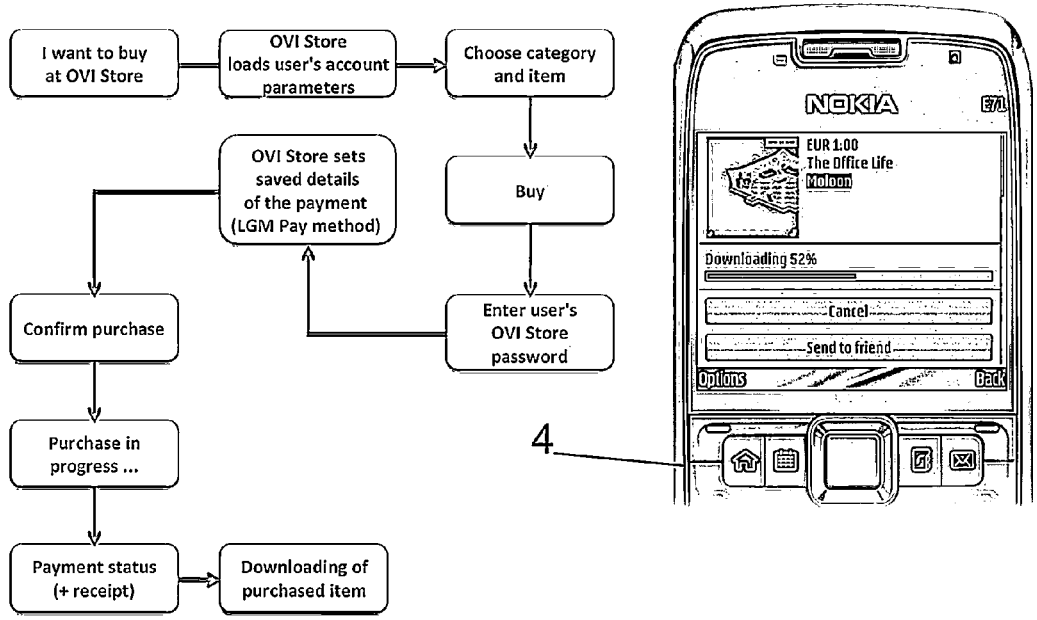

On FIGS. 16 to 19 there are diagrams showing the steps taken during the purchase in the trade system from the user's point of view. On FIG. 16 there is the step with the offer to purchase a specific item. On FIG. 17 there is an example of the selection of the payment method. On FIG. 18 there is the payment application's run. FIG. 19 demonstrates the download of the purchased item into the mobile communication device.

Figure 20:
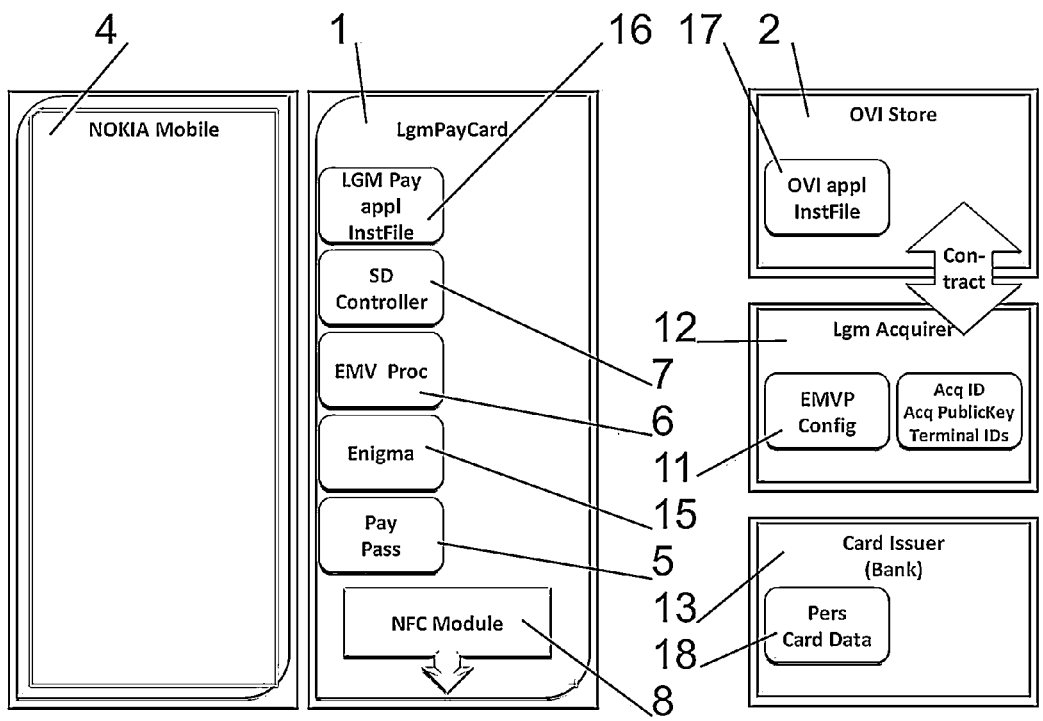

FIG. 20 shows the structure of elements, where the system encompasses a mobile phone, a removable memory card and then the headquarters of trade systems connected to acquirer, which is also connected to the cardissuer. On this figure we can also see how the acquirer's identificators, acquirer's public key and the terminal's identification are transferred to the database of the trade system's operator on the basis of the contract between the trade system's operator and the acquirer.

Figure 21:
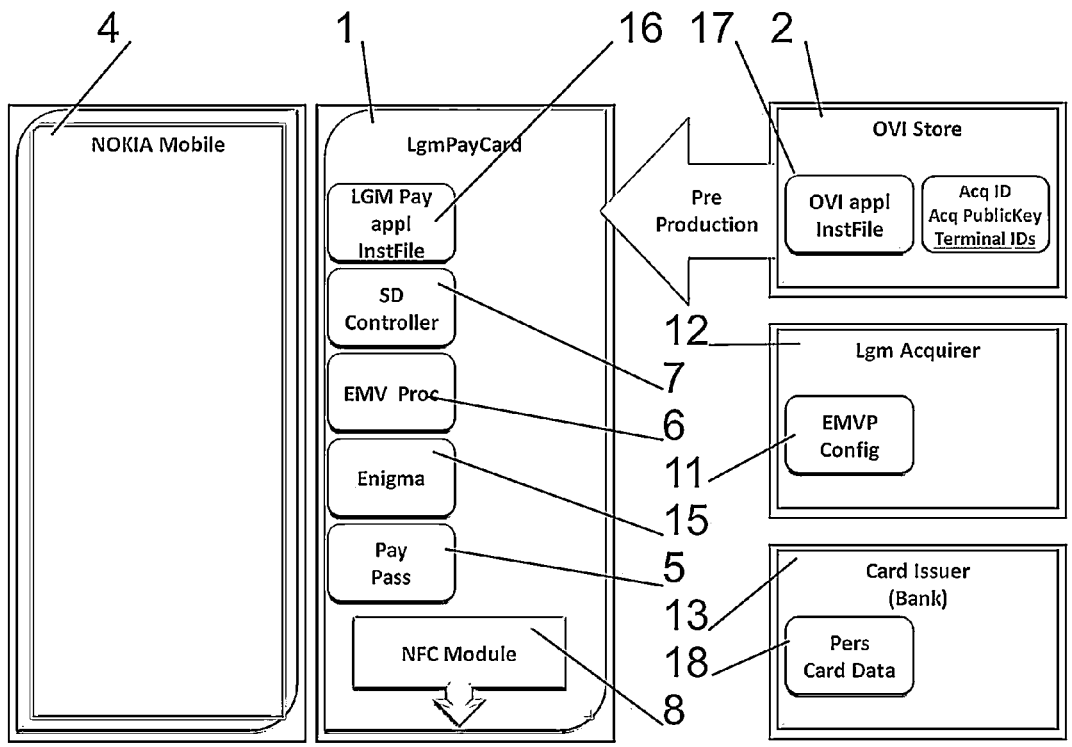
Figure 22:
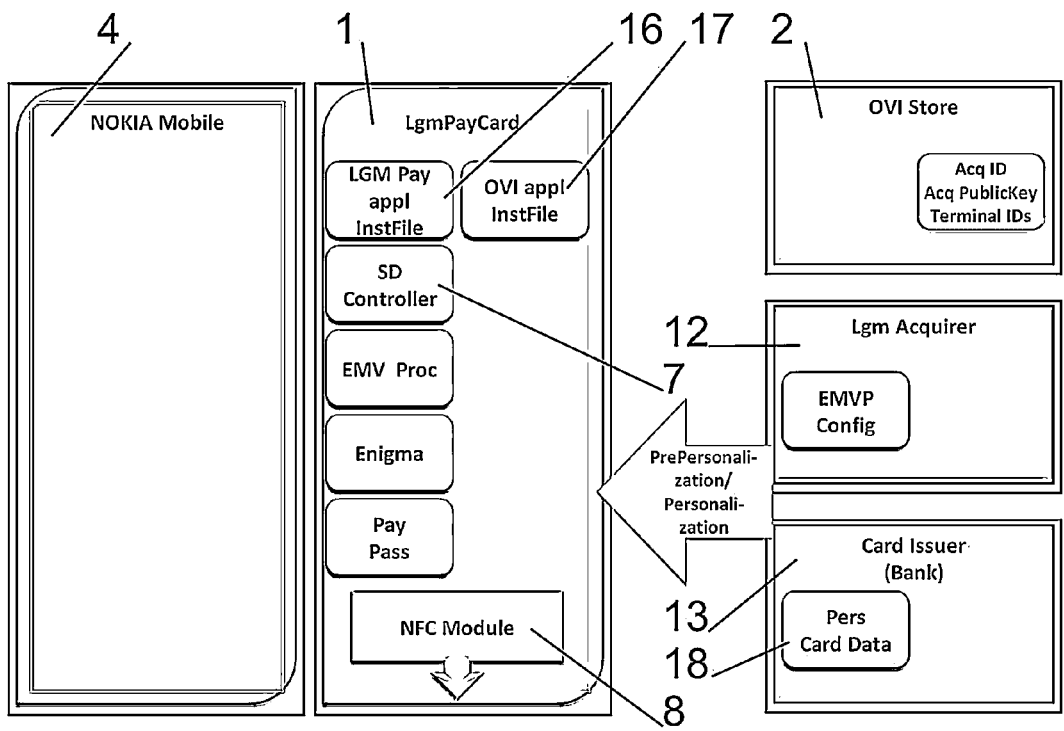

On FIG. 21 there is a pre-preparation phase with the step that lies in the fact that the trade system's files and applications are loaded into the removable memory card, which is managed by the acquirer. On FIG. 22 there is again the pre-preparation phase, now with the step during which the acquirer's and payment card's issuer's data are loaded into the removable memory card.

Figure 23:
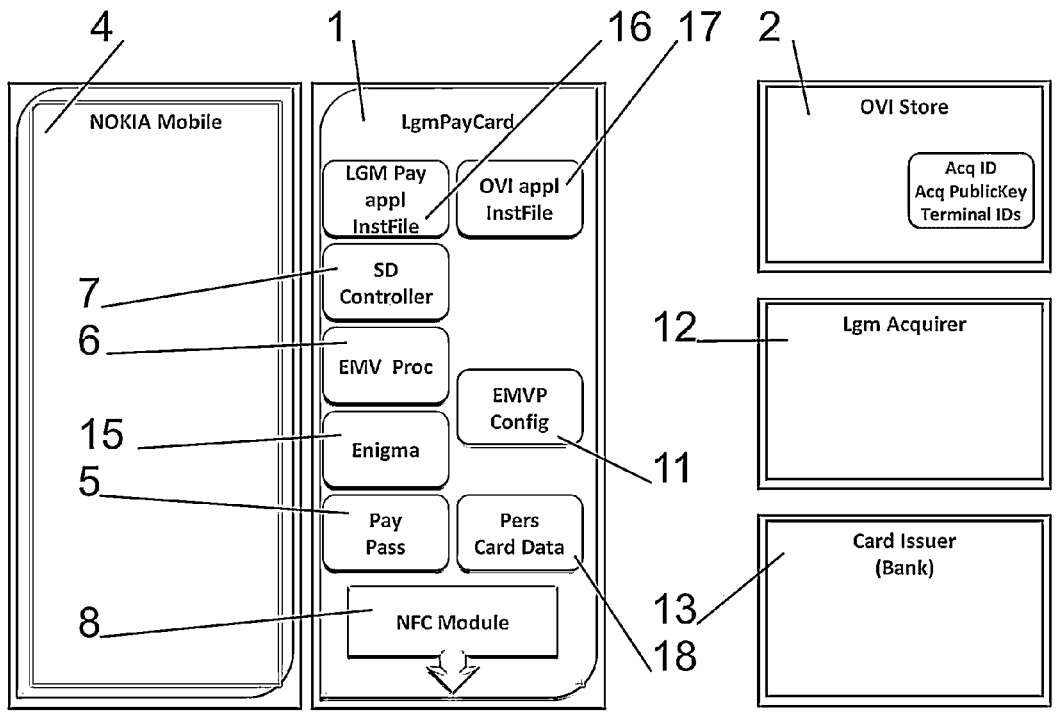
Figure 24:
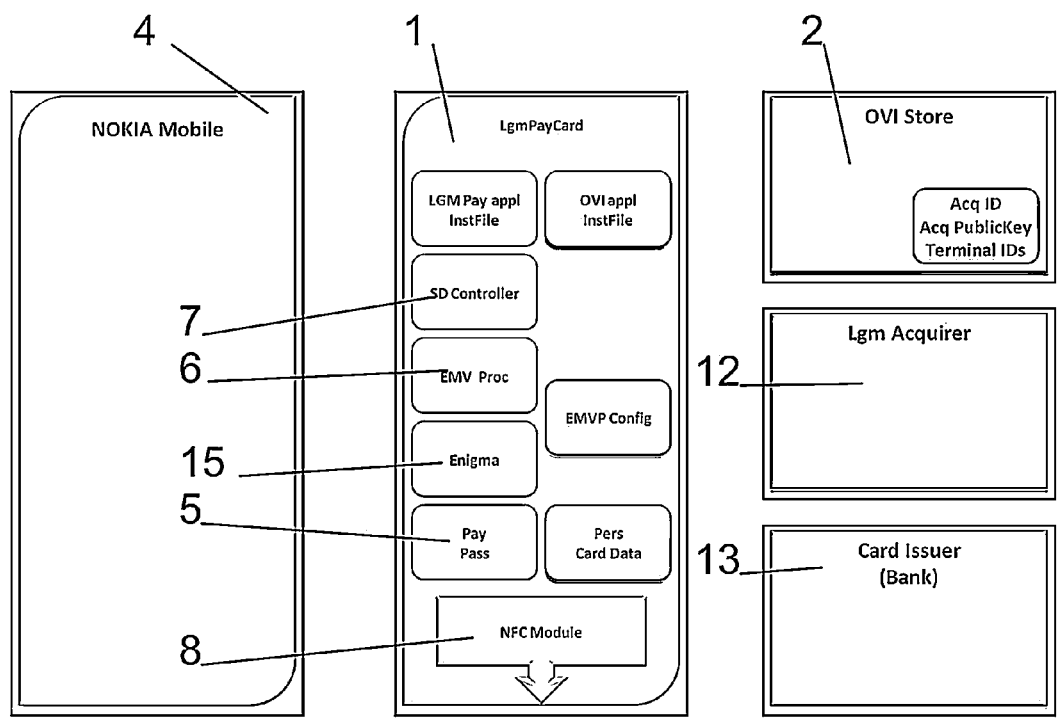

FIGS. 23 and 24 show the state after the pre-preparation phase when the necessary data and applications from all participants of the system are loaded on the removable memory card.

Figure 25:
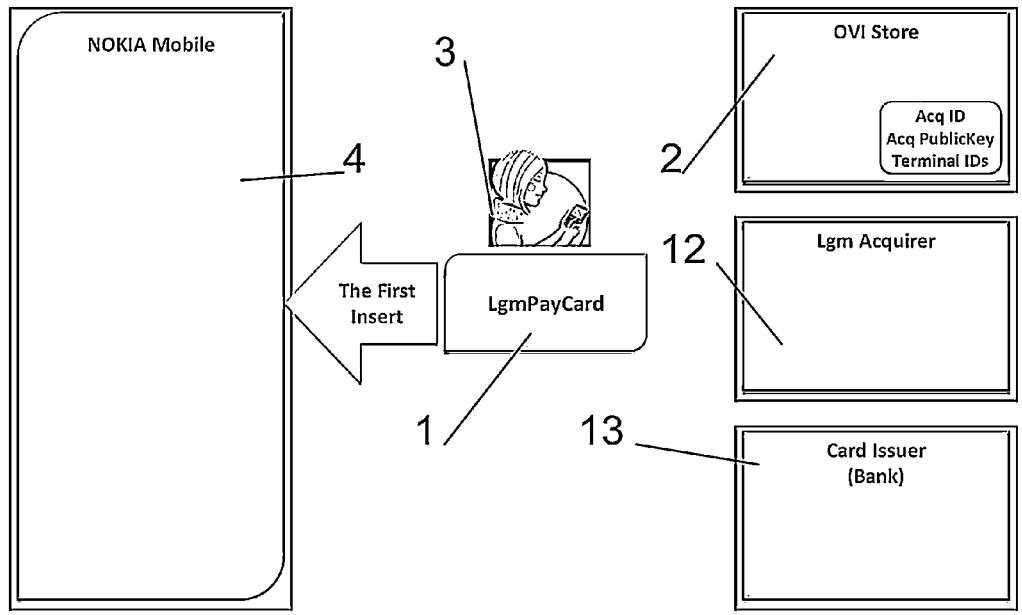

FIG. 25 shows a procedure of operations carried out in the preparatory phase within the mobile communication device.

Figure 26:
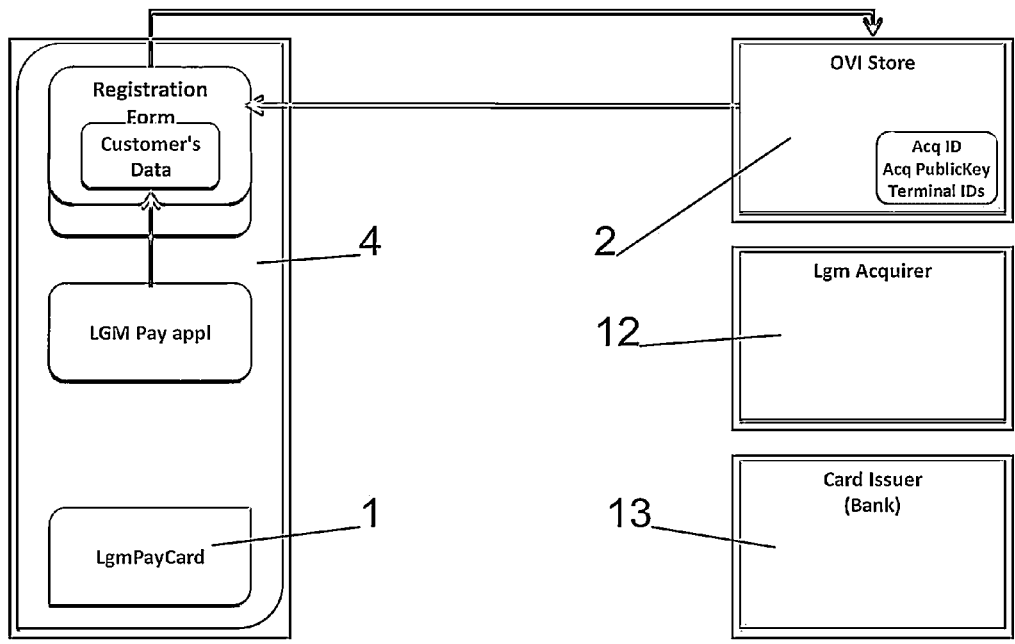

On FIG. 26 there is depicted the transfer of data from the mobile communication device to the trade system's headquarters during the preparatory phase.

Figure 27:
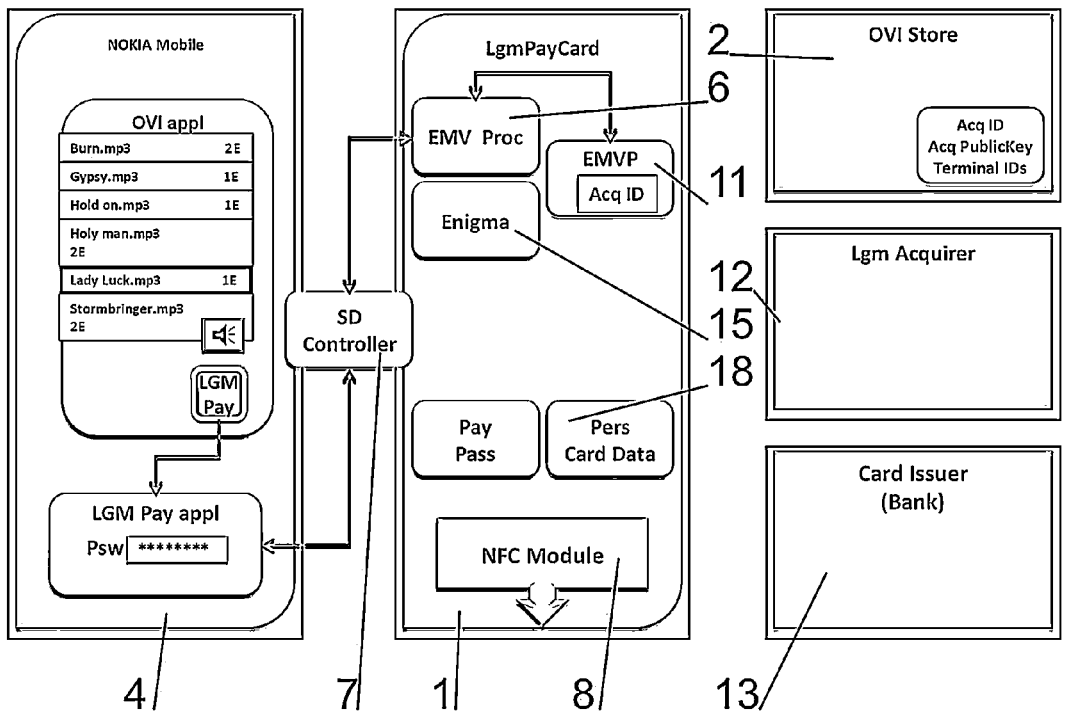

On FIG. 27 there are shown the relationships between individual elements during the start of the payment terminal application on the removable memory card. This activity is started by the offer to purchase selected item. On this picture we can see how after the correct password is entered, the payment terminal's identification data are requested.

Figure 28:
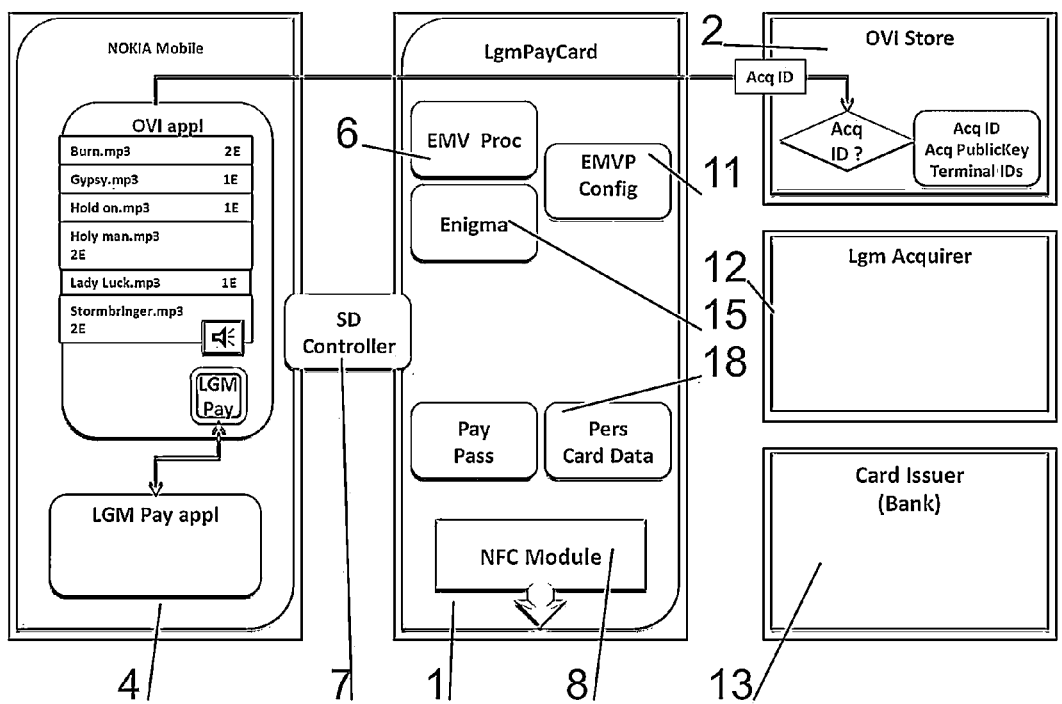

On FIG. 28 there is a step in which acquirer's identification is sent to the trade system's headquarters.

Figure 29:
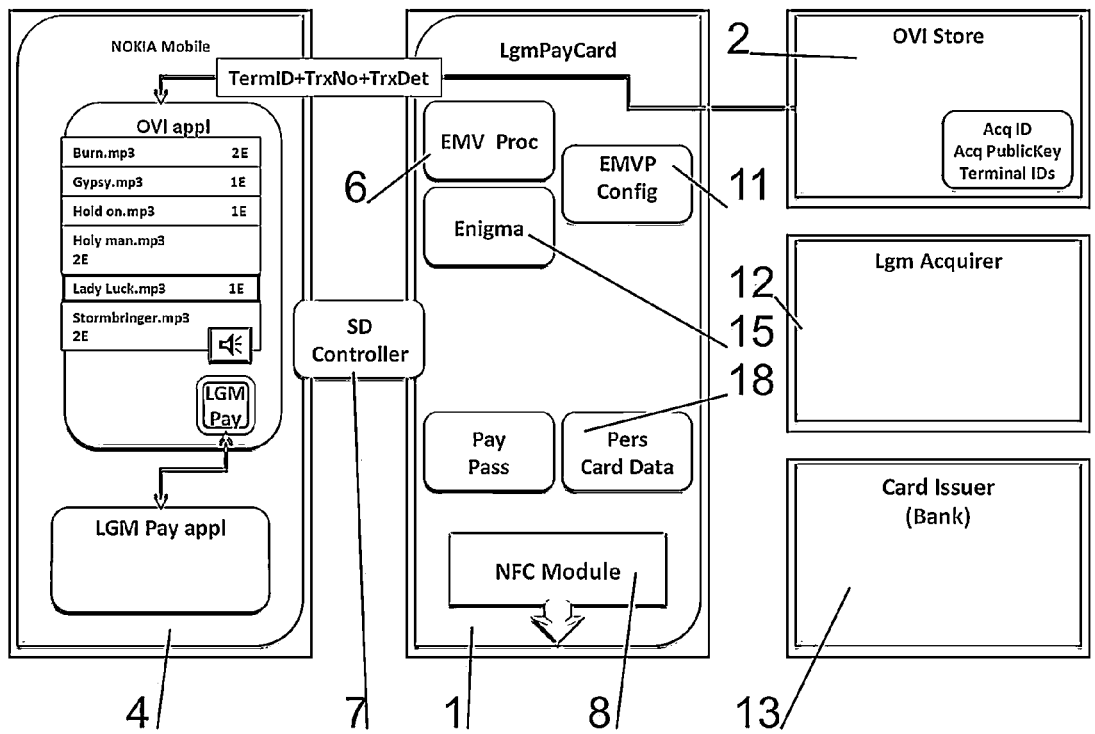

On FIG. 29 there is a step in which the payment parameters are sent from the trade system's headquarters to the mobile communication device.

Figure 30:
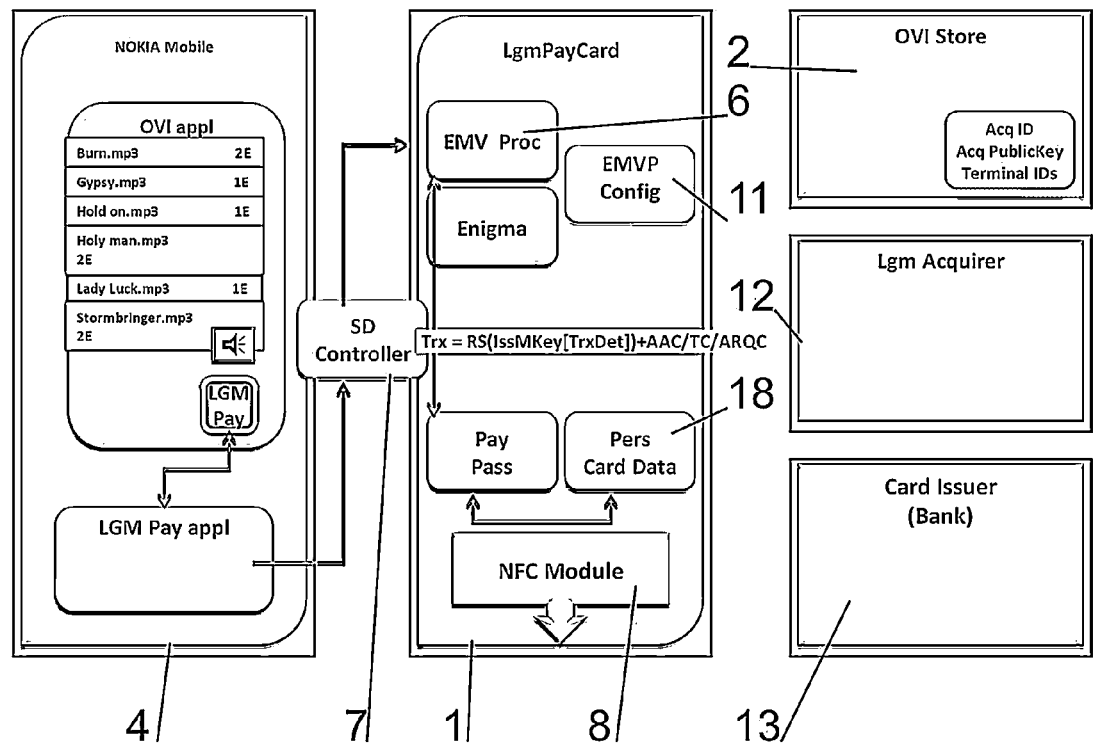

On FIG. 30 there is shown the way in which the payment parameters are transferred over the interface to the removable memory card, the payment parameters being used as an input into the payment-terminal application.

Figure 31:
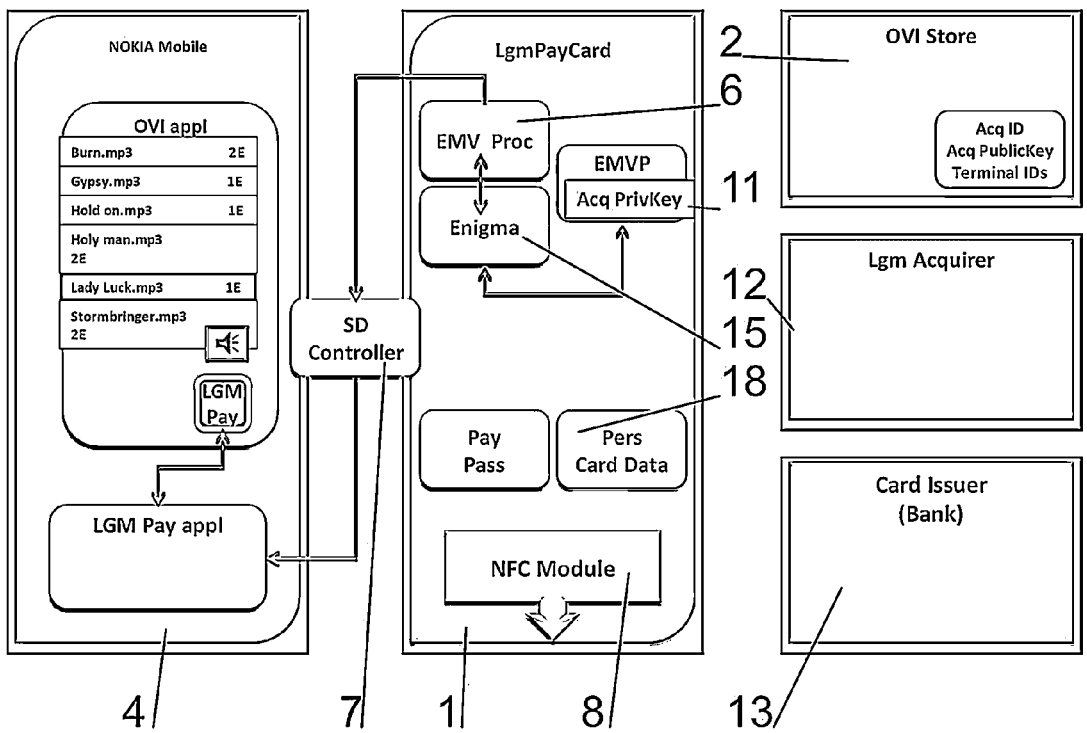

FIG. 31 depicts the course of processing and the encryption in the payment terminal unit using the acquirer's private key.

Figure 32:
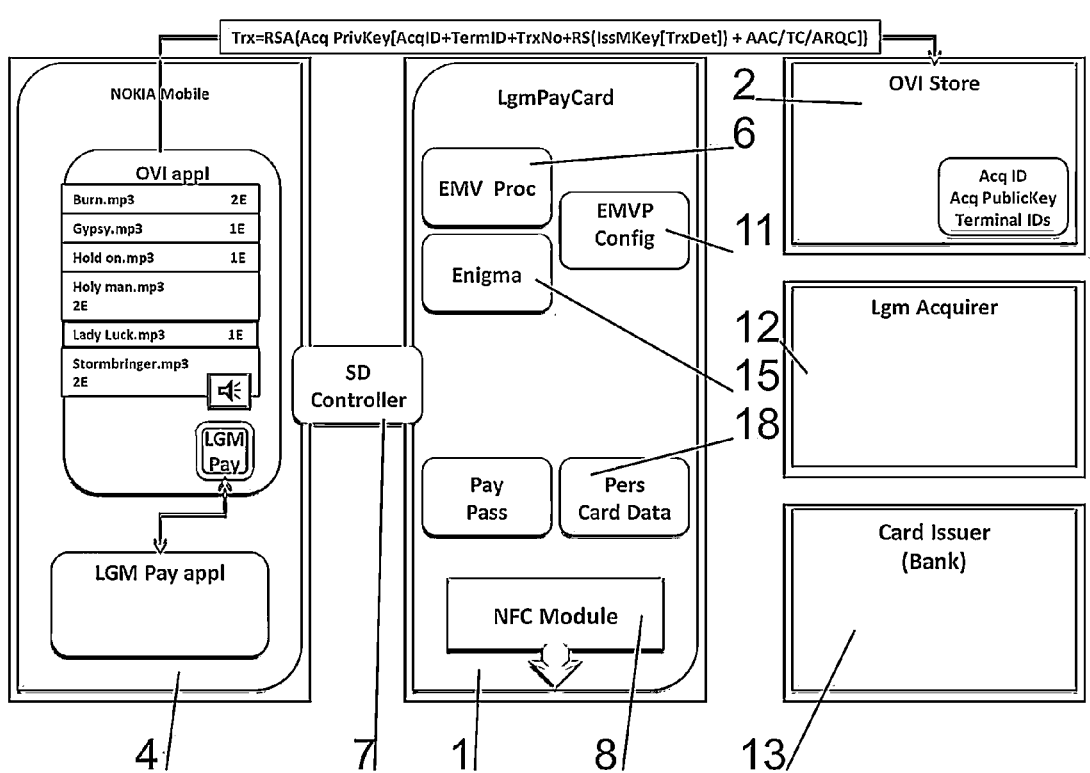

FIG. 32 shows how the payment cryptogram is transferred from the mobile communication device to the trade system's headquarters, while the payment cryptogram uses the card issuer's MasterKey and also the acquirer's private key.

Figure 33:
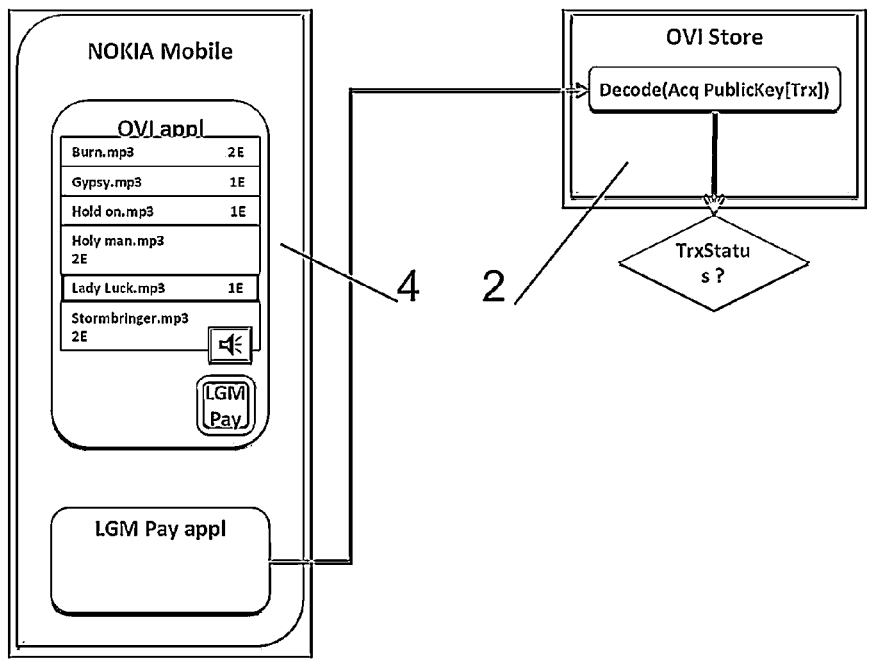

On FIG. 33 there is a step in which the payment cryptogram is evaluated during an offline payment.

Figure 34:
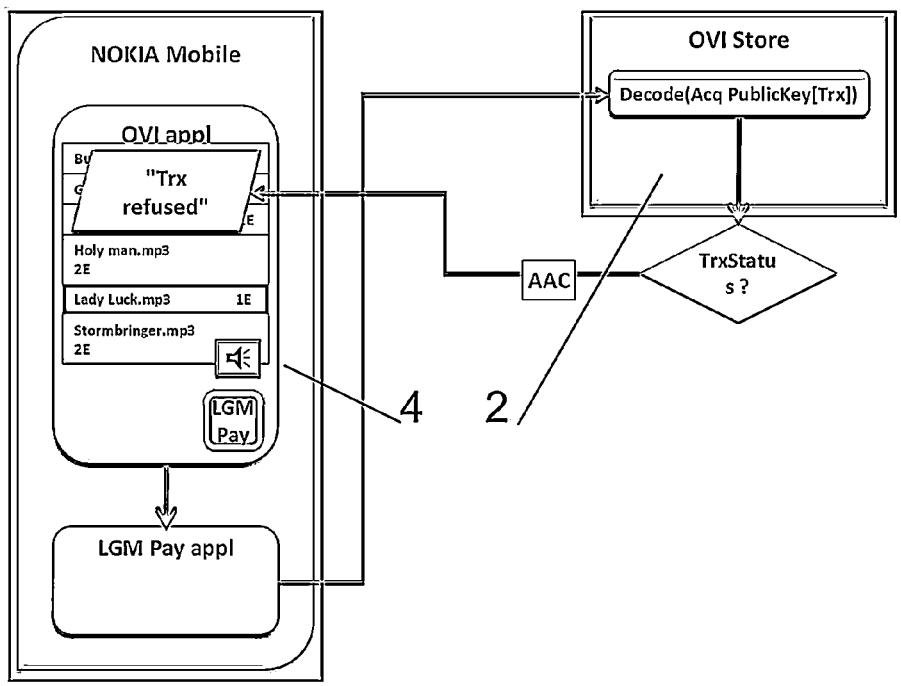

On FIG. 34 there is a example of declined payment.

Figure 35:
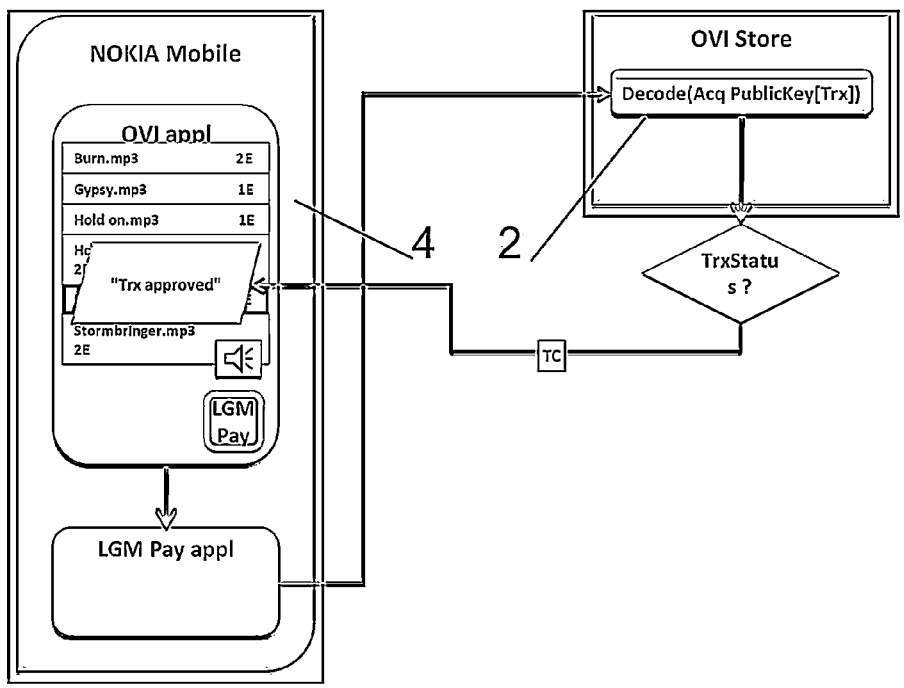

On FIG. 35 there is a example of online confirmation of the payment.

Figure 36:
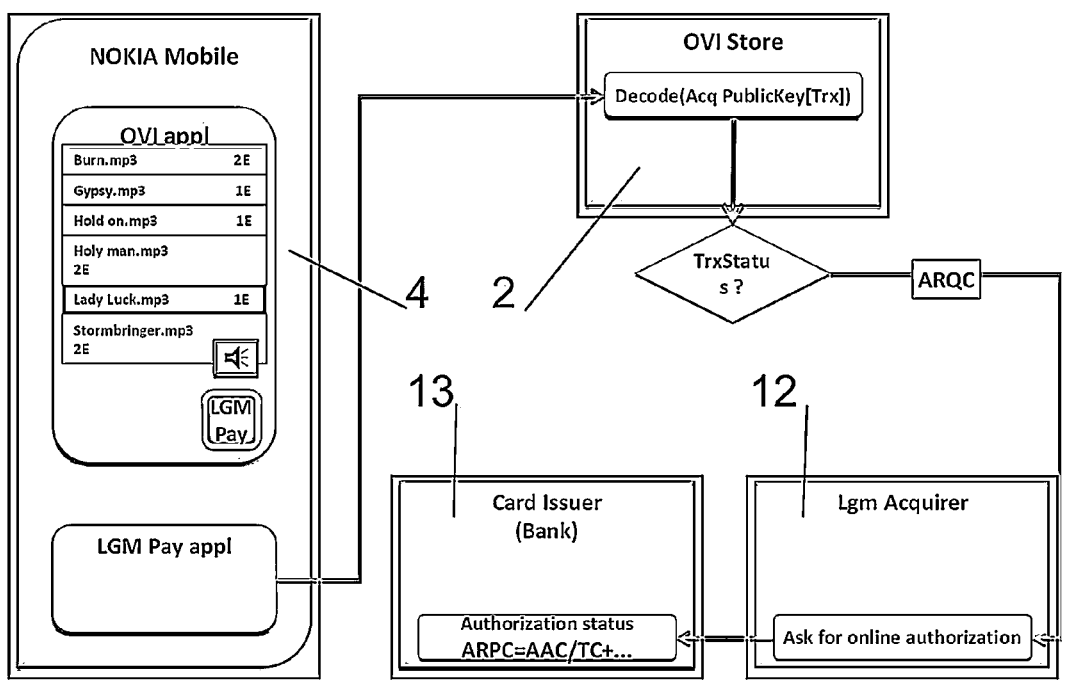

On FIG. 36 there is the beginning of the payment cryptogram's evaluation during online payment with the communication with the acquirer and with the card issuer.

Figure 37:
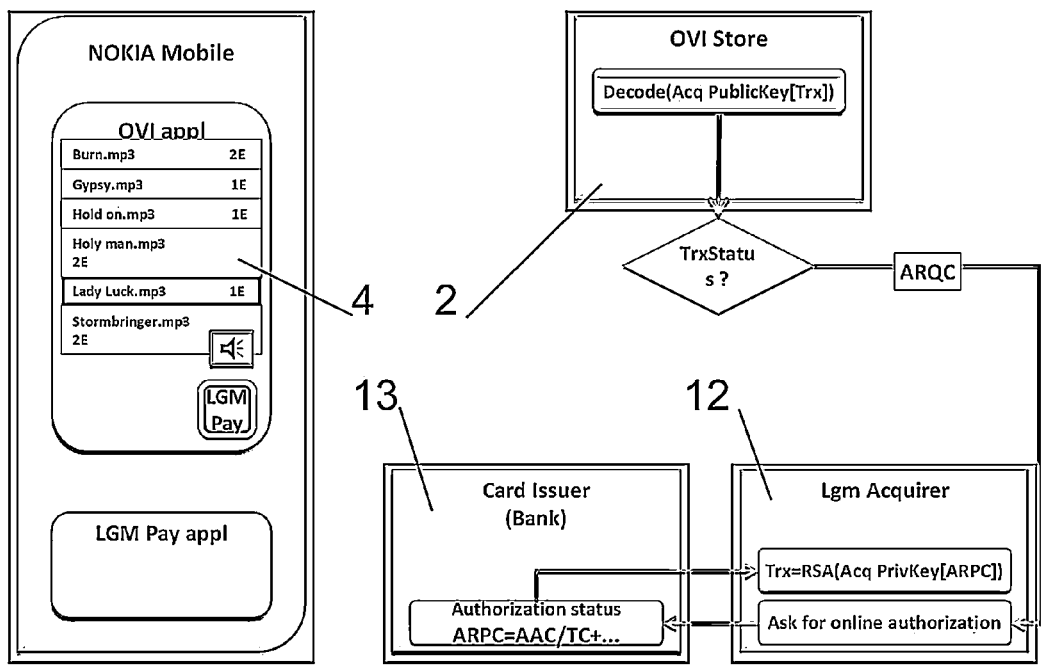

FIG. 37 depicts the relations between the card's issuer and the acquirer during online authorization.

Figure 38:
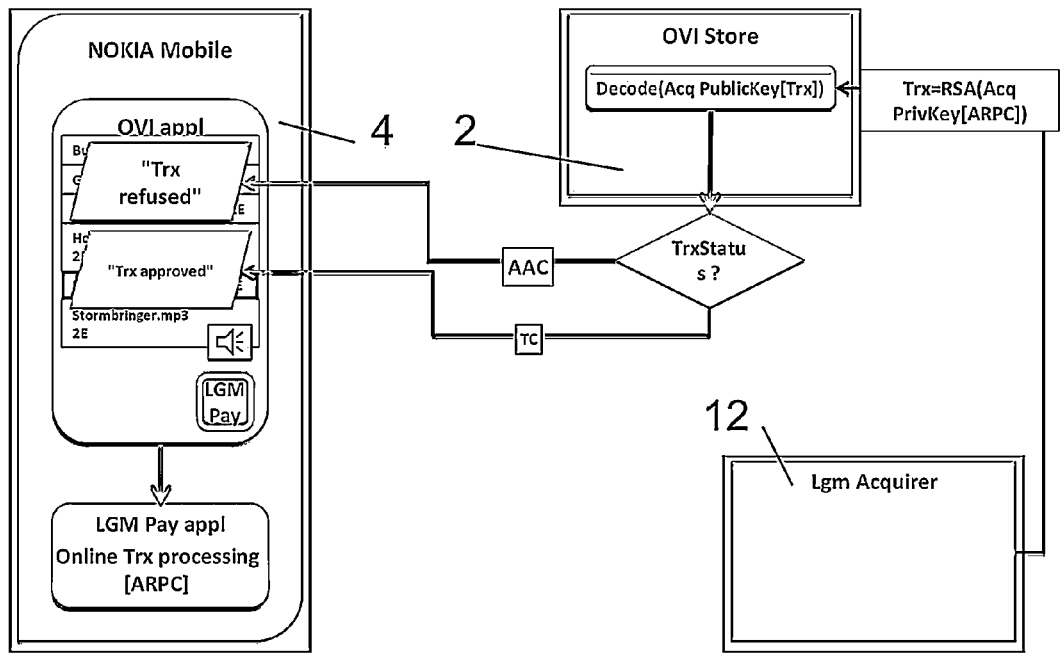

FIG. 38 depicts the way the encrypted ARPC response is sent from the acquirer into the trade system's headquarters, where the command is decrypted and evaluated.

Figure 39:
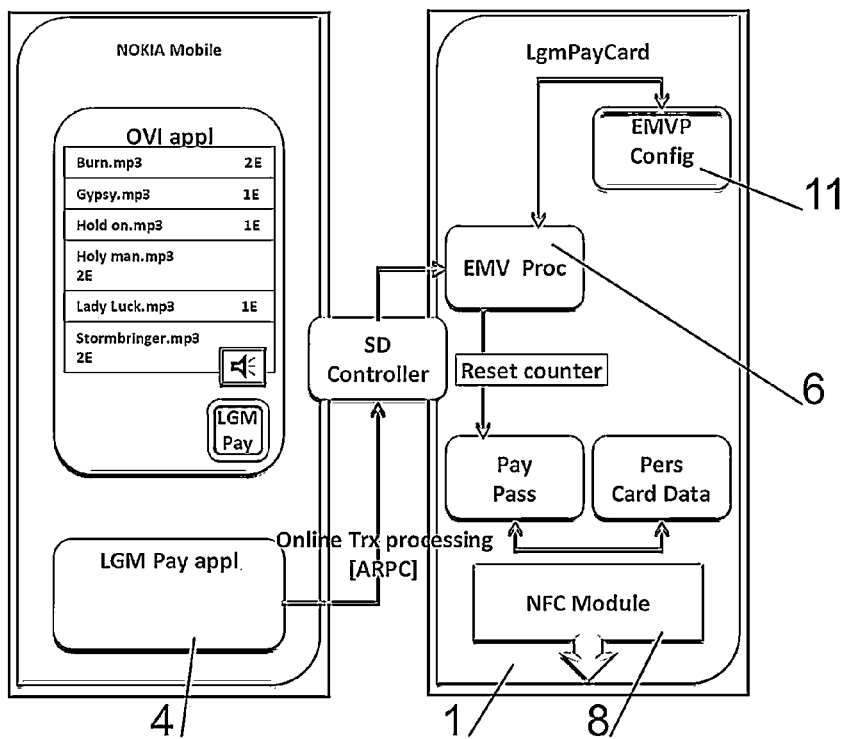

FIG. 39 depicts the course of resetting the counter on the payment card unit after a successful online payment.

Figure 40:
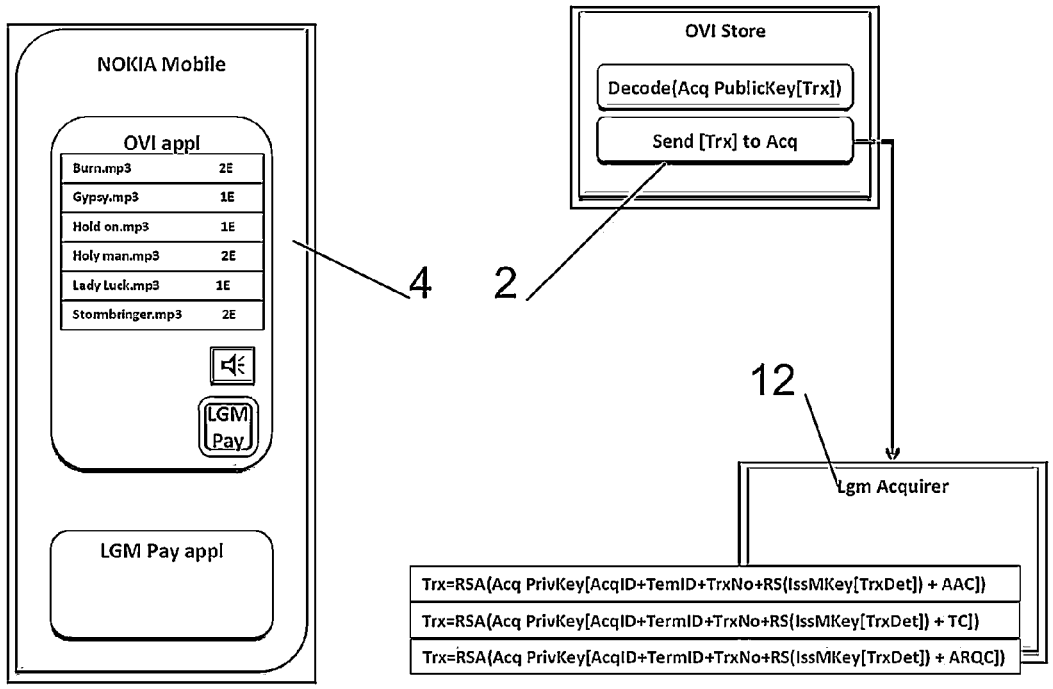

FIG. 40 depicts the possibilities of cryptograms on the acquirer's side.

Figure 41:
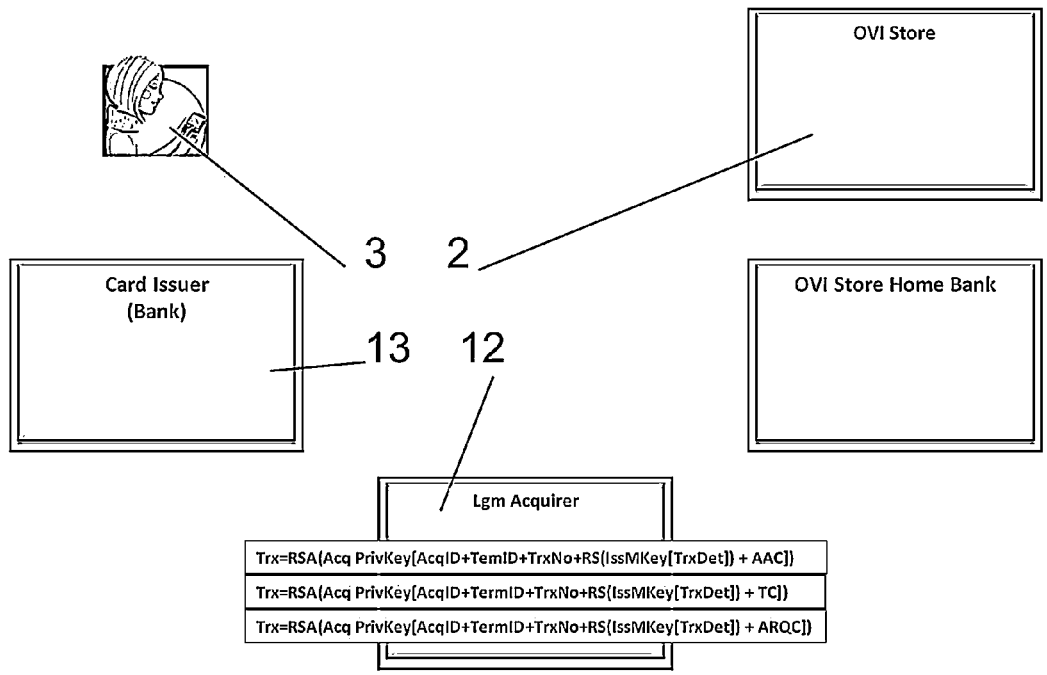

FIG. 41 depicts the acquirer's position with received cryptograms in relation to other participants involved in the trade system.

Figure 42:
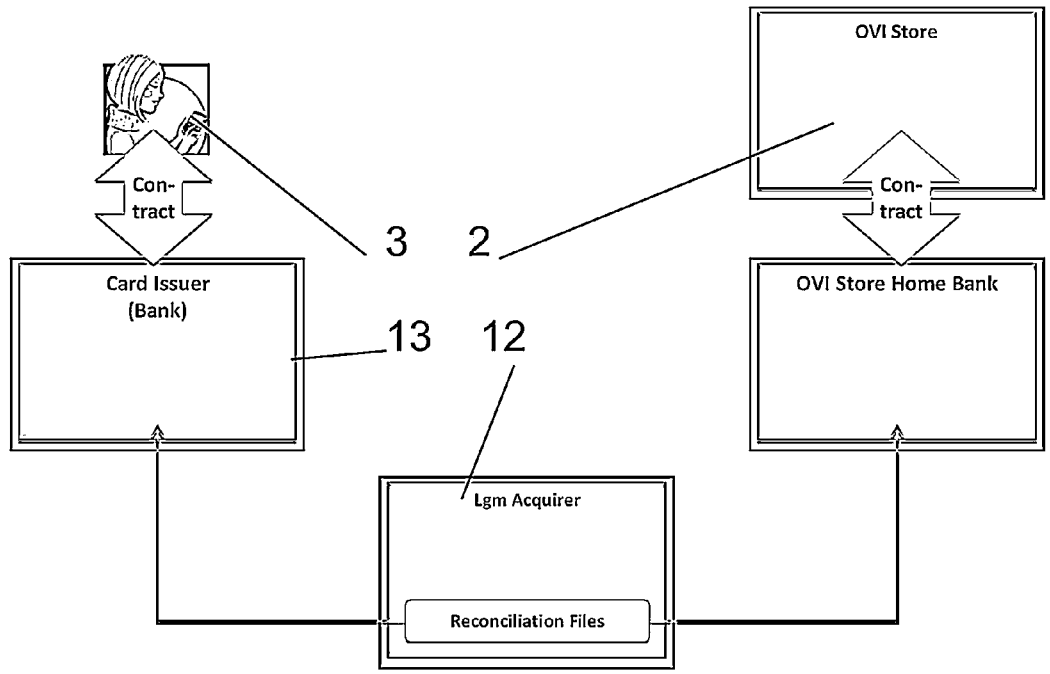

FIG. 42 is an example of communication during the settlement of realized payments with further participant, which is the bank of the trade system's operator.

Figure 43:
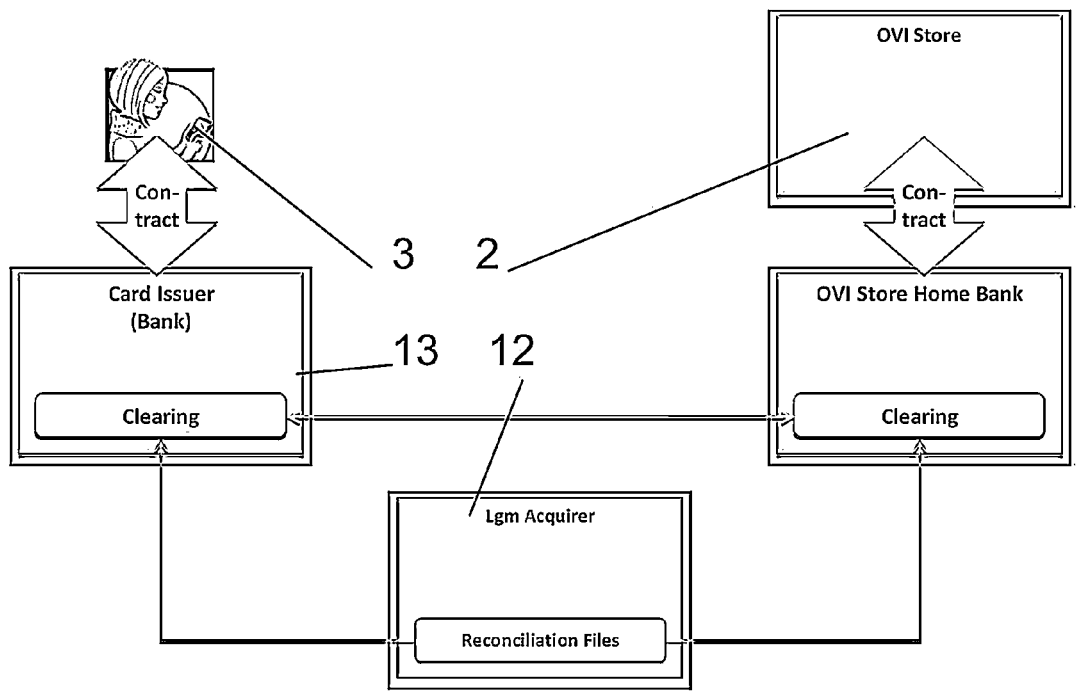
Figure 44:
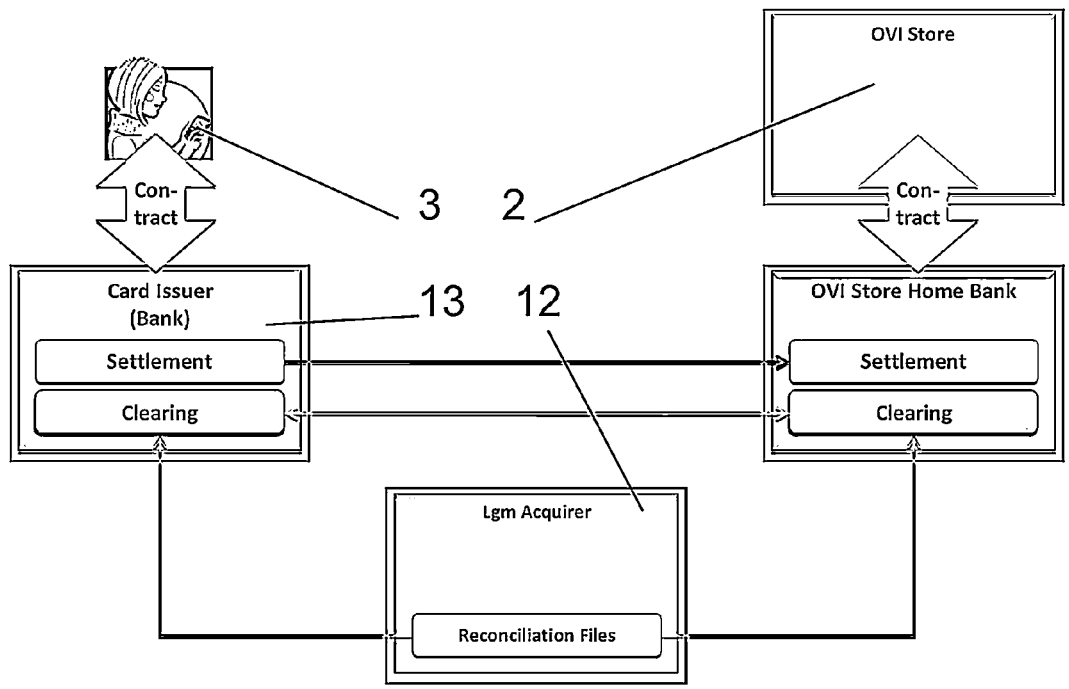

On FIGS. 43 and 44 we can see the clearing between the card issuer's bank account and trade system's bank account, where the relationship between the user, payment card's issuer, acquirer, trade system's operator's home account and the trade system's operator itself is shown.

Figure 45:
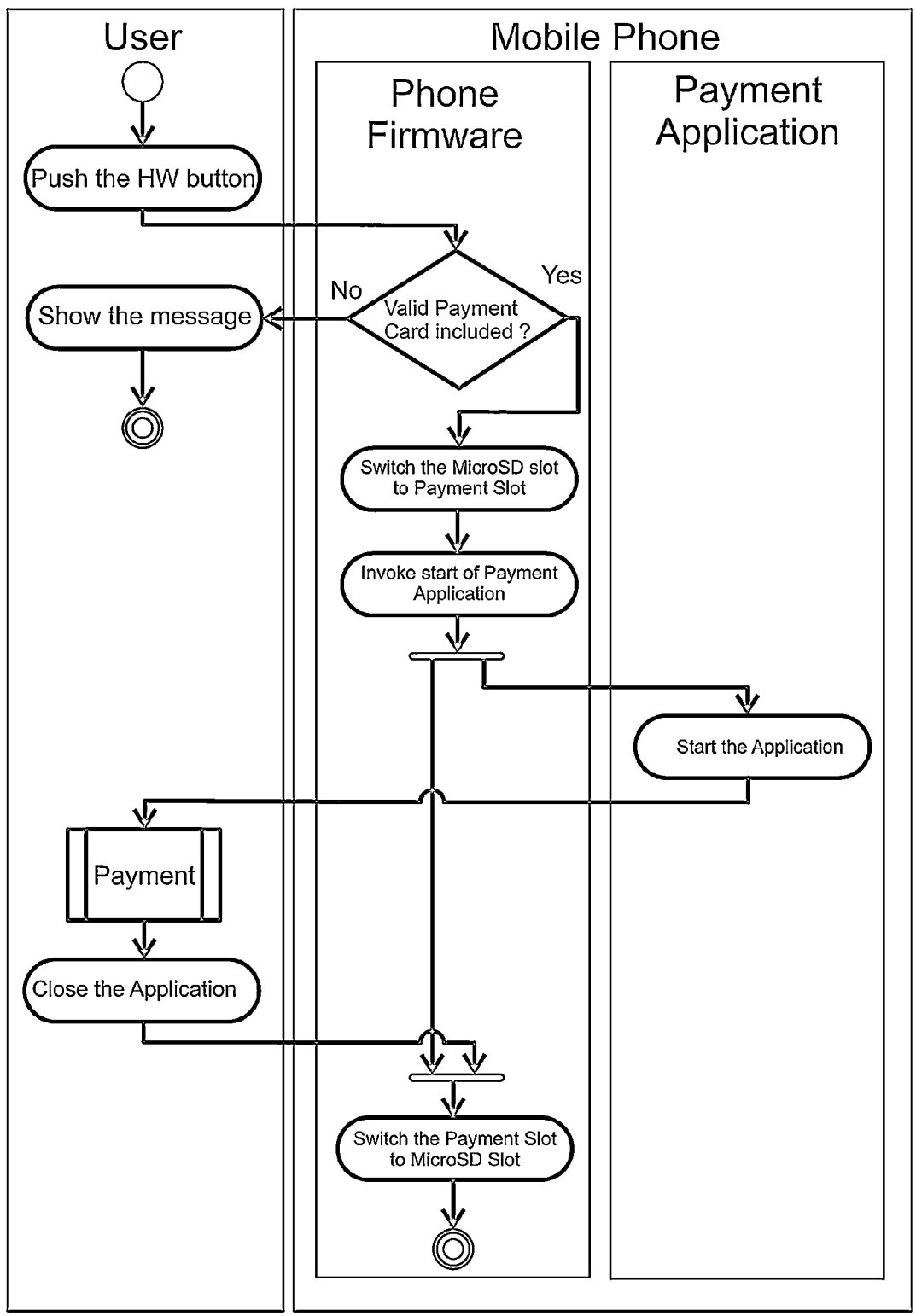

On the FIG. 45 there is a schematically displayed diagram showing the successiveness of the payment application's run with the press of the hardware payment button, where it is possible to see the localization of the individual tasks and processes during the launch of the application on the level phone hardware/phone firmware/removable memory card.

EXAMPLE

The trade system 2 known as OVI store, which is operated by the NOKIA company is described in this example according to FIGS. 1 to 44. The submitted technical solution is capable of cooperation with any other trade system 2 on the same principle and it is not necessary to consider the usage of the OVI store designation, which is registered mark of the NOKIA company as narrowing the scope of the protection. Also the usage of the image of the mobile communication device 4 in the form of the NOKIA E71 mobile phone is only an example that should facilitate understanding of relationships and processes in the system described and cannot be regarded as a narrowing of the required scope of protection.

The user 3 of the mobile communication device 4 Nokia E71 inserts a removable memory card, which he received from the issuer into his phone. The LGM acquirer 12 has a contract with the card's issuer 13 and also with the operator of the trade system 2 OVI store. Thanks to this cooperation, during the pre-preparation phase, the acquirer 12 stored the payment card unit 5, which contains the data in the same structure of existing ICC payment cards including the payment card's personal data unit 18 into the removable memory card 1. In the same time, even the program necessary for the communication with the trade system 2 is loaded on the removable memory card 1 and it is stored in the trade application installation unit 17. The user 3 could download this program into his mobile communication device 4 even from the OVI store trade system's 2 headquarters over the mobile network 14, however, for which he would have to pay as for common data transfer and therefore it is suitable if the corresponding software was located directly on the removable memory card 1.

Figure 1:
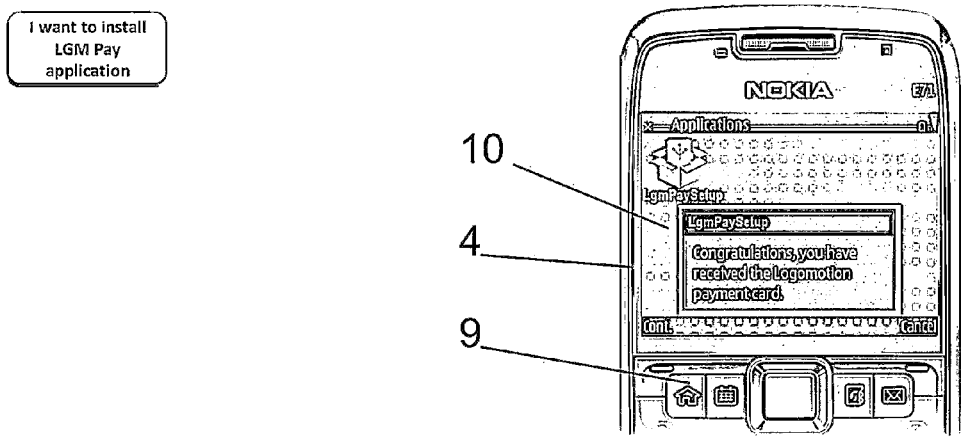
Figure 2:
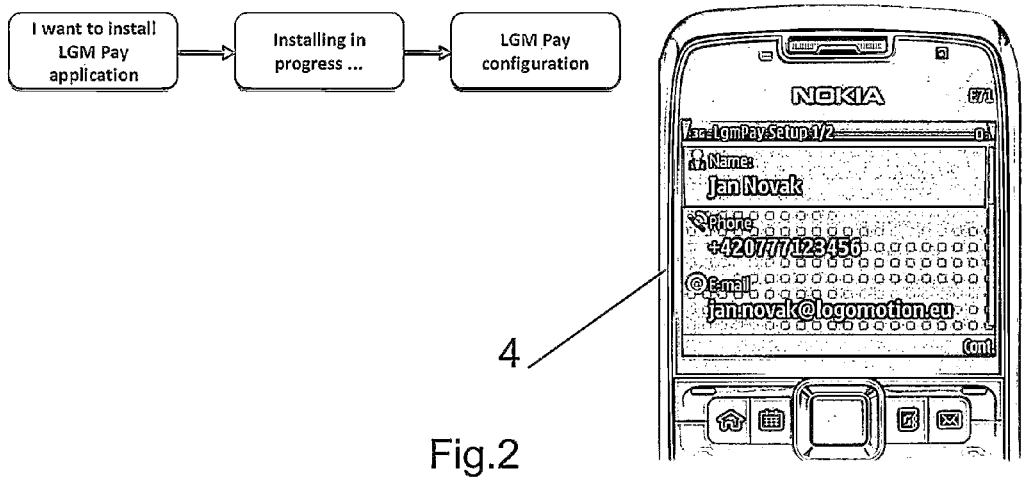
Figure 3:
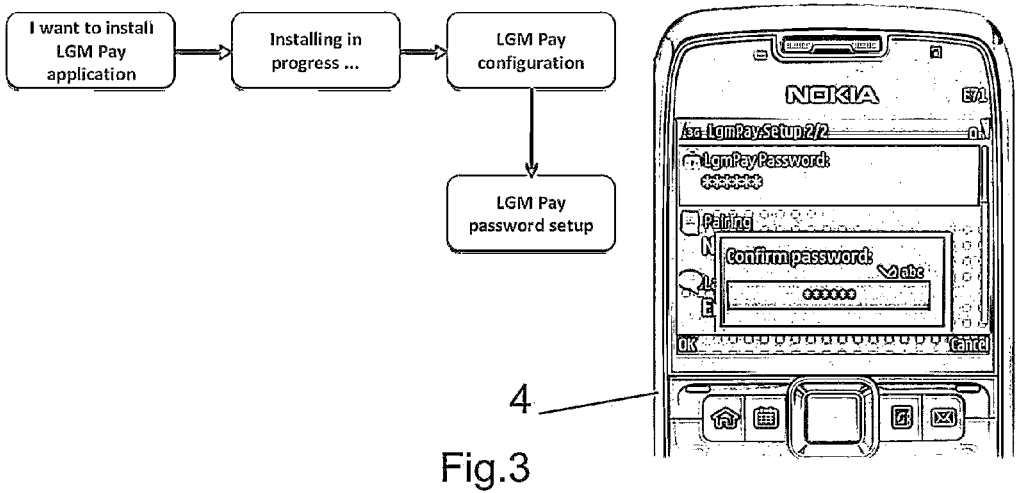
Figure 4:
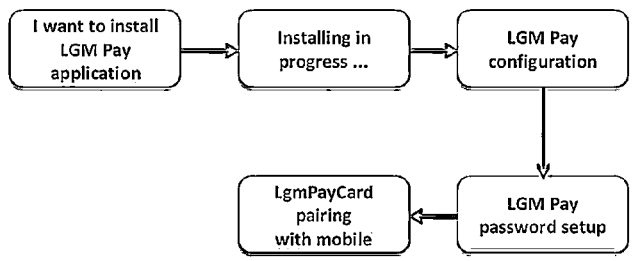
Figure 4:
Figure 5:
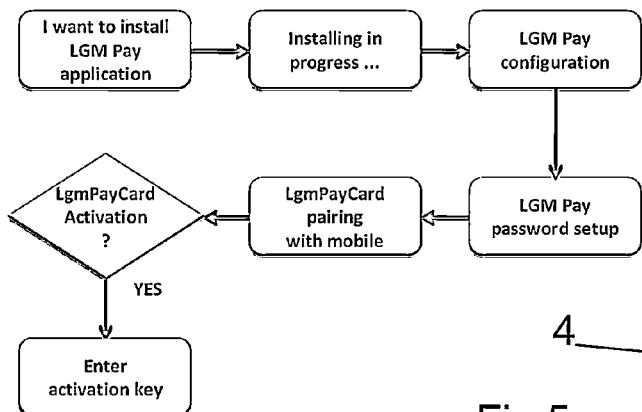
Figure 5:
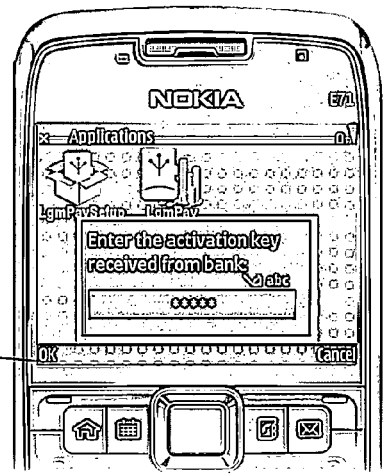
Figure 6:
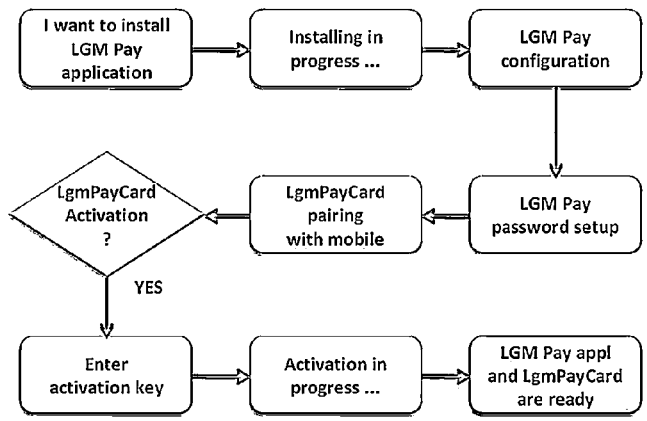
Figure 6:
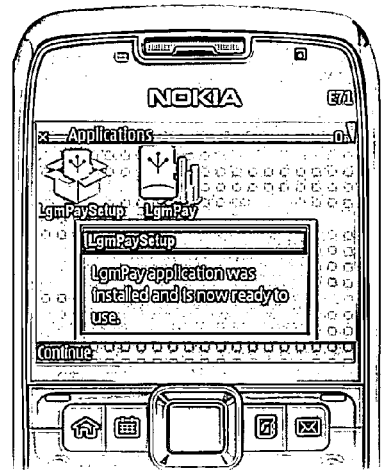

After the insertion of the removable memory card 1 into the slot that is accessible from the outside, the payment application's installation, which in this example is labeled as LGM payment application, is started automatically according to the FIGS. 12, 25 and 1. The run of the installation (FIGS. 1 to 6) is gradually shown on the display 10 of the mobile communication device 4 and the user 3 confirms the process and enters personal data and passwords through the keyboard 9 of the mobile communication device 4. Within the activation (FIG. 5), the user uses even the password from the card's issuer 13. After entering the correct password he is shown on the display 10 that the LGM payment application was installed and is prepared for usage (FIG. 6).

Figure 7:
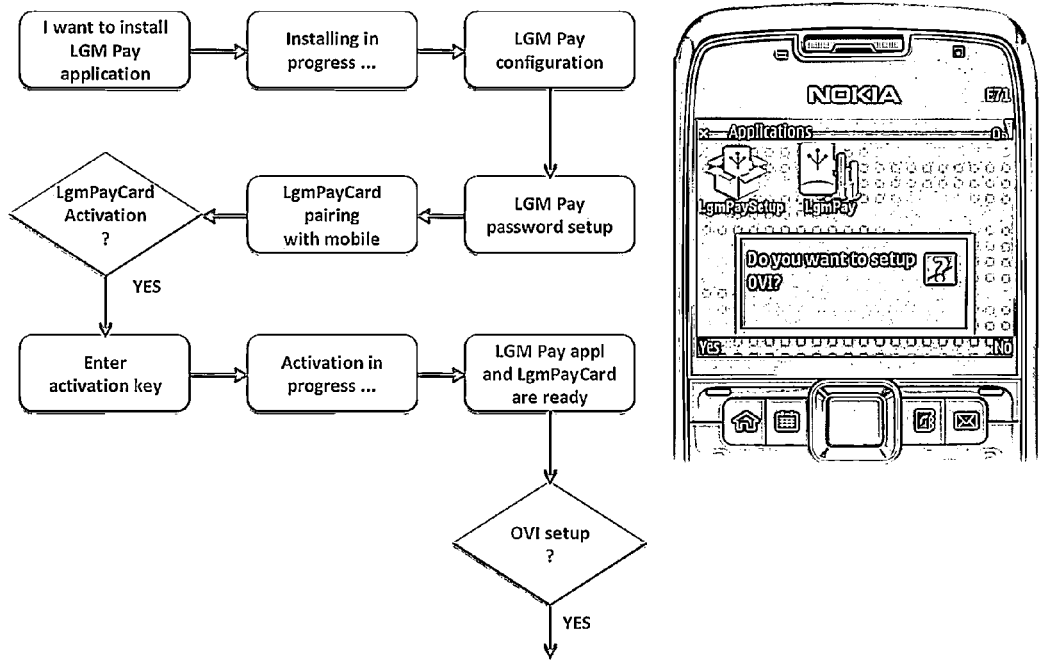
Figure 8:
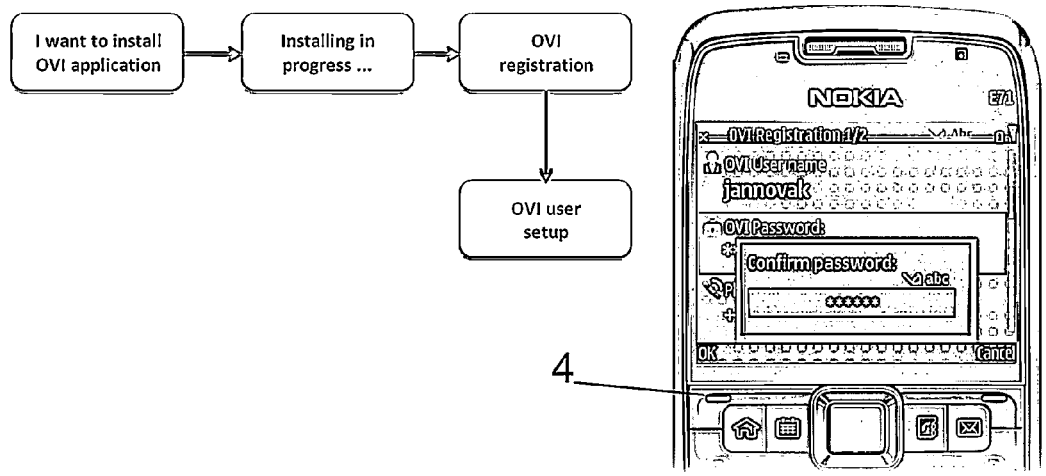
FIG. 8 shows the procedure diagram for the case, when after the payment application is installed there runs the installation of the application for the communication with the trade system.

In this example, the software necessary for the communication with the trade system was not yet installed in the mobile communication device 4 and therefore the user 3 is offered the possibility to install (FIG. 7). In another example, the trade system can be preset in such a way that no communication program is required directly in the mobile communication device 4 and it uses only a common internet explorer. The pre-preparation phase is depicted on the FIGS. 20 to 24.

The trade system's 2 operator and acquirer 12 signed a contract, on the basis of which the operator receives the parameters for the run of the transaction (identification of the acquirer 12 through ID, his public encryption key and the payment terminal's identificator set). In case of agreement, the acquirer 12 can ensure the placement of the trade application installation unit 17.

During the pre-preparation phase, within the part we can label as prepersonalization of the removable memory card 1 (e.g. with the LgmPayCard name), the configuration data for the payment terminal (e.g. in the EMVP structure) unit 6 placed into the configuration data unit 11, which is usually in the form of a protected Secure Element. The payment terminal unit 6 will fulfill the role of the virtual POS terminal for the payments in the trade system 2. During the personalization the LgmPayCard parameters are placed into the Secure Element.

Figure 9:
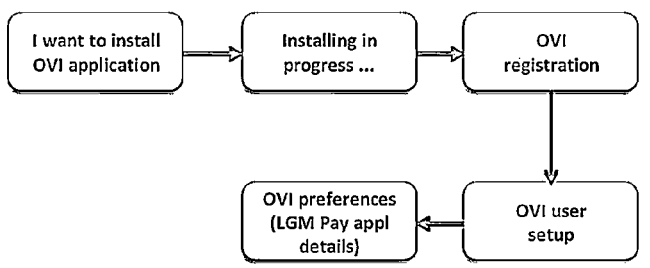
FIG. 9 shows the presetting of the preferential payment method in the application for the communication with the trade system On FIG. 10 there is a process of user registration in the trade system.
Figure 9:
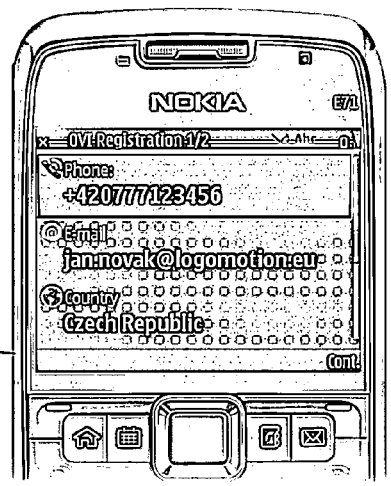
Figure 10:
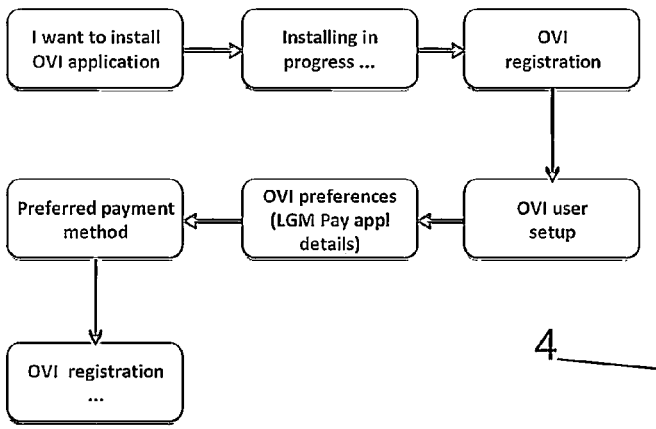
Figure 10:
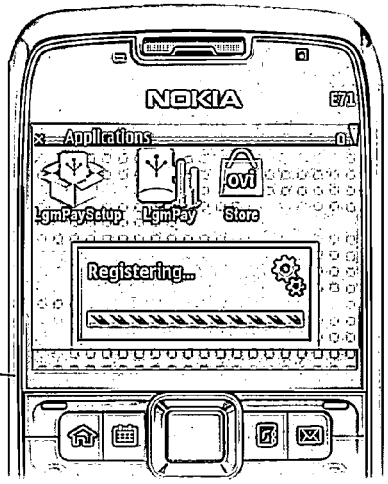

During the installation of the trade system 2 it is preset, that the preferential way of payment is the payment over the LGM payment application (FIG. 9). In principle, it is possible to use even other types of payments, where the payment card units 5 are located within the mobile communication device 4 and the removable memory card 1. After the trade system 2 software, in this case in the form of OVI store, installation is finished, the user 3 is offered the possibility to shop (FIG. 11) in the trade system 2. From the user's 3 point the course of payment in the trade system 2 is almost the same as in case of existing way of payment (FIGS. 16 to 19). After the selection of the purchased item the possibilities of payment appear on the display 10 of the mobile communication device 4. In this case three possibilities appeared on the display 10 and these are payment by the VISA card, payment by the MasterCard card and payment over the LGM Pay payment terminal. The controller 7 manages the communication between the LGM payment application and the LgmPayCard.

The user 3 selected LGM Pay and entered the correct password. Subsequently, the task—request for the acquirer's identification 12—runs over the microSD controller 7 (FIG. 27) in the removable memory card 1. The acquirer's identification 12 is loaded from the configuration data unit 11 into the EMV processor unit, which represents the payment terminal 6 unit. From there the acquirer's identification 12 is sent over the microSD controller 7 and the mobile data network 14 (FIG. 28) into the trade system's headquarters 2. There it is evaluated if the acquirer's identification 12 belongs to any of the entities with which the the trade system's 2 operator has a contract. The positive response runs a task on the side of the trade system 2 during which transaction payment parameters are sent back into mobile communication device 4. These include even the payment amount, in this example in the form of TermID+TrxNo+TrxDet. The LGM payment application sends request for transaction with corresponding parameters to the payment terminal 6 unit, where it is evaluated in cooperation with the payment card application (e.g. PayPass risk management) and the transaction in EMV standard is prepared. The encryption runs over the card issuer's 13 masterkey.

The data are sent over the microSD controller 7 into the payment terminal 6 unit, which in this phase (FIG. 30) operates as a payment terminal of the acquirer 12. The communication between the payment terminal 6 unit and the payment card 5 unit now runs within the removable memory card 1 during which a cryptogram is created using MasterKey of the card's issuer 13, e.g. in the form of Trx=RS(IssMKey[TrxDet])+AAC/TC/ARQC. The payment cryptogram, in this example in the form of EMV as Trx=RSA(AcqPrivKey[AcqID+TermID+TrxNo+RS(IssMKey[TrxDet])+AAC/TC/ARQC]) is sent from the mobile communication device 4 into the headquarters of the trade system 2. This payment cryptogram was created by being encrypted by the acquirer's 12 private key and where the part of the encrypted file is a cryptogram encrypted using the card issuer's 13 MasterKey (FIG. 32). The encryption and decryption on the platform of the removable memory card 1 is ensured by an encryption unit 15.

Its status is evaluated in the trade system's 2 headquarters using the acquirer's 12 public key (FIG. 33). The evaluation of the offline payment is depicted in FIGS. 33 and 35. If the result contains the file in the form of AAC, the payment and by that the entire business transaction is declined, the situation of which the user 3 is informed subsequently (FIG. 34) on the display 10. In case of a positive offline response (FIG. 35) the result of the payment TC is decided without a communication with the acquirer 12. TC means that the user 3 will be informed that the payment was successful and that the items which were paid for are prepared to be downloaded.

The decryption of the payment cryptogram is possible thanks to the fact that the trade system 2 operator has previously stored public encryption keys from the acquirer 12. The operator evaluates further proceedings according to the decrypted message.

The approved online payments are depicted in FIGS. 36 to 38. This kind of procedure is necessary in case when higher amount is being paid or after the preset number of offline payment is realized. The request ARQC file is sent (FIG. 37) from the trade system's 2 headquarters to the acquirer 12, which sends the task for online authorization to the card's issuer 13. The authorization of the status runs there and a response is created. In this response there is a response encrypted e.g. in the form Trx=RSA(Acq PrivKey[ARPC]) by the acquirer's 12 private key. The acquirer 12 sends this response into the trade system's headquarters 2, where the response is decrypted (FIG. 38) by the acquirer's 12 public key and sends the result in the form of AAC or TC into the mobile communication device 4. The card's issuer 13 returns the result of the on-line verification (ARPC=(AAC or TC)+ further data, that can be additional above the data from the trade system 2.

On the side of the trade system 2 the successful payment starts download of the data paid for into the mobile communication device 4. By this the entire business case is ended from the outside point of the view of the user 3. On FIG. 39 it is shown how it is possible to reset the counter on the payment card unit 5 after the successful realization of the online payment. The ARPC file is sent into the payment terminal 6 unit over microSD controller 7, where it is evaluated as an instruction to reset the counter since the APRC response file represents the confirmation on the successful realization of the online payment. The specific parameters, the number of newly possibile offline payments is controlled by the Risk management preset by the payment card's issuer 13 in the payment card's unit 5. The reset of the counter enables to realize a preset number of offline payments.

The subsequent clearing heading to the billing of money is realized using the stored cryptograms, e.g. in the form Trx=RSA(AcqPrivKey[AcqID+TermID+TrxNo+RS (IssMKey[TrxDet])+AAC]), Trx=RSA(AcqPrivKey[AcqID+TermID+TrxNo+RS(IssMKey[TrxDet])+TC]), Trx=RSA(Acq PrivKey[AcqID+TermID+TrxNo+RS (IssMKey[TrxDet])+ARQC]). According to FIG. 40, these are located at the acquirer's 12 server and according to the processes that were agreed on and contracted beforehand (FIGS. 41 to 44) the acquirer sends it to be settled between the card's issuer 13 bank and the trade system's 2 operator bank. All the transactions (offline and online) are sent in time intervals that were pre-agreed. The billing of transactions and the payments are realized in accordance with the standards of the participating banks and they are of the same form as in case of physical POS terminals at standard merchants.

In this case, there is also a NFC communication element 8 with an antenna on the removable memory card 1 even though it was not active in any of the steps decribed here. It is designed on the realization of payments over NFC readers of the standard POS terminals, which considerably extends the possibilities of usage of the payment devices on the removable memory card 1.

All the labels used as OVI store, NOKIA, Logomotion are registered marks of the corresponding owners and do not set the scope of protection according to the solution described. In principle the submitted solution is usable in any trade system 2 with the same or similar structures.

INDUSTRIAL USABILITY

The industrial usability is obvious. According to this solution it is possible to industrially and repeatedly install, configure and use the way and process while selling in the trade system that is accessible from the mobile communication device. During this the payment terminal located on the removable memory card is used. The advantage is a high security while retaining current data standards of the payment transactions.

LIST OF RELATED SYMBOLS

1—removable memory card
2—trade system
3—user
4—mobile communication device
5—payment card unit
6—payment terminal unit
7—controller
8—communication element
9—keyboard
10—display
11—configuration data unit
12—acquirer
13—card's issuer
14—mobile data network
15—encryption unit
16—payment application installation unit
17—trade application installation unit
18—payment card personal data unit
GPRS—General packet radio service
ICC—integrated circuit card
EMV—Europay, MasterCard, VISA
AAC—Application Authentication Cryptogram
ARQC—Authorization Request Cryptogram
ARPC—Authorization Response Cryptogram
POS—point of sale
TC—Transaction Certificate
GUI—Graphical user interface

The invention claimed is:
1. A method for purchasing from an electronic store that is accessible from a mobile communication device via a mobile data network, wherein purchased items are downloaded from a trade system's headquarters into the mobile communication device, the method comprising:
sending an activation command to a removable memory card in the mobile communication device in response to the selection of an item to be purchased from the electronic store, the removable memory card including payment terminal data and applications for implementing a payment terminal, payment card data and applications associated with a payment card issued by a payment card issuer, and configuration data;
transferring identification data associated with an acquirer from a portion of the removable memory card storing the configuration data to a portion of the memory card storing the payment terminal data;
sending identification data associated with the acquirer via the mobile network from the mobile communication device to the trade system's headquarters;
receiving a determination that the identification data associated with the acquirer corresponds to identification data associated with a permitted acquirer that are stored at the trade system's headquarters and receiving a set of payment parameters initialized for a transaction by the payment terminal in the mobile communication device, the mobile communication device processing the received payment parameters,
creating a payment cryptogram on the removable memory card using a master key associated with the payment card issuer of the payment card, and sending the payment cryptogram to the trade system's headquarters for evaluation.

2. The method of claim 1, further comprising:
requiring a user of the mobile communication device to enter a correct password before the activation command is sent to the removable memory card.

3. The method of claim 1, wherein the evaluation of the payment cryptogram comprises decrypting the payment cryptogram using a public key associated with the acquirer and subsequent evaluation of the decrypted cryptogram according to rules of online or offline payment.

4. The method of claim 3, wherein the decrypted cryptogram is evaluated as an offline decline or confirmation of a payment and a user is informed about an unsuccessful or successful result of a requested purchase on a display of the mobile communication device.

5. The method of claim 3, wherein, after the evaluation of the cryptogram, an authorization request cryptogram (ARQC) task is sent to the payment card issuer from the trade system's headquarters,
wherein an authorization request cryptogram (ARPC) response file, which is encrypted by a private key associated with the acquirer, is created at the payment card issuer and sent to the trade system's headquarters, and
wherein the encrypted ARPC response file is decrypted in the trade system's headquarters using a public key associated with the acquirer, and the decrypted ARPC response file, in the form of an application authentication cryptogram (AAC) decline or a transaction certificate (TC) approval, is sent into the mobile communication device.

6. The method of claim 5, wherein, after an approval of online payment in the form of an ARPC is received by the mobile communication device, the payment terminal causes a counter on the removable memory card to be reset.

7. The method of claim 1, wherein, during a preparation phase, a payment terminal application located on the removable memory card is installed, and personal data associated with a user is entered either during or after the installation of the payment terminal application.

8. The method of claim 7, wherein, during the preparation phase, the removable memory card is paired with the mobile communication device over a SIM card or a phone number.

9. The method of claim 7, wherein user data entered during the installation of the payment terminal application are available to be transferred to the trade system's headquarters during subsequent installation and registration of an application for communication with the trade system.

10. The method of claim 7, wherein user data entered during installation of the payment terminal application are ready to be transferred into the trade system's headquarters during the following installation and registration of the application for the communication with the trade system.

11. The method of claim 1, wherein, during a preparation phase, software devices associated with the payment card issuer are stored to the removable memory card.

12. The method of claim 1, wherein, during a preparation phase, software devices associated with the trade system's operator are stored to a trade application installation unit on the removable memory card.

13. The method of claim 1, wherein, during a preparation phase, software devices associated with the trade system's operator are stored to the configuration data on the removable memory card.

14. The method of claim 1, wherein the removable memory card encrypts stored data.

15. The method of claim 1, wherein the acquirer provides a received payment cryptogram for settlement between a bank associated with the trade system and the issuer of the payment card or a bank associated with a user.

16. The method of claim 1, wherein a user is enabled to control an installation run of the removable memory card with the payment terminal over a graphical user interface of the mobile communication device.

17. The method of claim 1, wherein software associated with the acquirer is activated after the removable memory card is first inserted into the mobile communication device.

18. The method of claim 1, wherein an activation of the removable memory card in the mobile communication device causes a preferential presetting of a payment process using a payment terminal associated with the acquirer.

19. The method of claim 1, wherein, after a payment hardware button on the mobile communication device is pressed, the removable memory card switches into an access mode for the payment function wherein access to the payment card is allowed, and
wherein, before the payment hardware button on the mobile communication device is pressed, the removable memory card is in an access mode for a memory capacity extension function and the payment card is inaccessible.

20. The method of claim 19, wherein, if the payment process is ended and/or interrupted while the removable memory card is in the access mode for the payment function, the removable memory card switches into the access mode for the memory capacity extension function.

* * * * *